(12) United States Patent
Connor

(10) Patent No.: US 8,905,611 B2
(45) Date of Patent: Dec. 9, 2014

(54) ANTLIGHTS (TM) BICYCLE LIGHTS THAT SPAN A BILATERAL SAFETY ZONE

(75) Inventor: Robert A. Connor, Forest Lake, MN (US)

(73) Assignee: Medibotics LLC, Forest Lake, MN (US)

( * ) Notice: Subject to any disclaimer, the term of this patent is extended or adjusted under 35 U.S.C. 154(b) by 479 days.

(21) Appl. No.: 13/374,063

(22) Filed: Dec. 9, 2011

(65) Prior Publication Data
US 2013/0148375 A1 Jun. 13, 2013

(51) Int. Cl.
*F21S 4/00* (2006.01)
*F21V 8/00* (2006.01)

(52) U.S. Cl.
CPC .. *F21S 4/00* (2013.01); *G02B 6/001* (2013.01)
USPC .......................................... 362/554; 362/473

(58) Field of Classification Search
None
See application file for complete search history.

(56) References Cited

U.S. PATENT DOCUMENTS

| | | | |
|---|---|---|---|
| 1,994,837 A | 3/1935 | St. Onge | |
| 2,153,634 A | 4/1939 | Magarian | |
| 2,233,039 A | 2/1941 | Vianzone | |
| 2,416,160 A | 2/1947 | Davidsson | |
| 2,469,944 A | 5/1949 | Bauters | |
| 2,540,394 A | 2/1951 | Hollingsworth | |
| 2,603,701 A | 7/1952 | Schadel, Jr. | |
| 2,694,138 A | 11/1954 | Schwinn | |
| 2,788,763 A | 4/1957 | Ries | |
| 2,793,284 A | 5/1957 | Simoneit | |
| 2,797,621 A | 7/1957 | Galden | |
| 3,099,243 A | 7/1963 | Schwartz et al. | |
| 3,478,713 A | 11/1969 | Brames | |
| 3,528,721 A | 9/1970 | LaLonde | |
| 3,586,348 A | 6/1971 | Rich, Jr. | |
| 3,696,334 A * | 10/1972 | Demeter | 340/432 |
| 3,812,815 A | 5/1974 | Kuenzel | |
| 3,862,410 A | 1/1975 | Maxwell | |
| 3,878,810 A | 4/1975 | Conrad | |
| 3,887,900 A | 6/1975 | Goedert | |
| 3,890,497 A | 6/1975 | Rush | |
| 3,907,404 A | 9/1975 | McEwin | |
| 3,916,377 A | 10/1975 | Demeter | |
| 3,944,255 A | 3/1976 | Martinson | |
| 3,945,336 A | 3/1976 | Harris | |
| 3,945,337 A | 3/1976 | Sweetman | |
| 3,950,727 A | 4/1976 | Smith | |
| 3,961,596 A | 6/1976 | Schiavone | |
| 3,967,575 A | 7/1976 | Coutts | |
| 3,972,302 A | 8/1976 | Sherman | |
| 3,974,369 A | 8/1976 | Chmela et al. | |
| 3,982,771 A | 9/1976 | Tropeano | |
| 3,987,409 A | 10/1976 | Freeman | |
| 4,011,443 A | 3/1977 | Smith et al. | |
| 4,019,171 A | 4/1977 | Martelet | |
| 4,020,458 A | 4/1977 | Windisch | |

(Continued)

Primary Examiner — Sharon Payne

(57) ABSTRACT

This invention comprises a flexibly-resilient system of lighting that spans a bilateral safety zone around a bicycle in the upper-rear quadrant of space around the bicycle that can be clearly seen by the driver of a vehicle approaching the bicycle from the rear. This invention can help to prevent bicyclists from being hit by a vehicle from behind during the evening or at night, especially when a bicyclist is stopped at an intersection. This bicycle lighting system may also prove useful for reducing the chances of bicyclists being hit by vehicles that are turning right at an intersection, at any time of the day. This invention corrects many of the limitations of the prior art and can be a significant advance in bicycle safety.

19 Claims, 5 Drawing Sheets

(56) References Cited

U.S. PATENT DOCUMENTS

| | | |
|---|---|---|
| 4,023,032 A | 5/1977 | Taylor et al. |
| 4,027,150 A | 5/1977 | Dean |
| 4,038,935 A | 8/1977 | Margiloff |
| 4,041,452 A | 8/1977 | Moya |
| 4,046,098 A | 9/1977 | Mancinelli |
| 4,046,397 A | 9/1977 | Kitrell |
| 4,049,959 A | 9/1977 | Ledterman |
| 4,051,361 A | 9/1977 | Lichon et al. |
| 4,085,317 A | 4/1978 | Mithoff |
| 4,088,882 A | 5/1978 | Lewis |
| 4,099,159 A | 7/1978 | Windisch |
| 4,099,222 A | 7/1978 | Cornell et al. |
| 4,103,924 A | 8/1978 | Suhm |
| 4,105,286 A | 8/1978 | Curran |
| 4,108,535 A | 8/1978 | Slaughter |
| 4,113,351 A | 9/1978 | Kitrell |
| 4,115,942 A | 9/1978 | Sears |
| 4,116,154 A | 9/1978 | Harris |
| 4,145,989 A | 3/1979 | Hatcher |
| 4,157,075 A | 6/1979 | Kirvutza |
| 4,201,975 A | 5/1980 | Marcus |
| 4,204,191 A | 5/1980 | Daniels |
| 4,274,127 A | 6/1981 | Beck et al. |
| 4,290,048 A | 9/1981 | Cutlip et al. |
| 4,309,741 A | 1/1982 | Smith |
| 4,319,307 A | 3/1982 | Turner |
| 4,321,883 A | 3/1982 | Ruppa |
| 4,337,503 A | 6/1982 | Turner |
| 4,342,280 A | 8/1982 | Ashworth |
| 4,365,581 A | 12/1982 | Margiloff |
| 4,417,783 A | 11/1983 | Le Vantine |
| 4,422,615 A | 12/1983 | McManus |
| 4,483,586 A | 11/1984 | Sisto |
| 4,495,553 A | 1/1985 | Haynes |
| 4,571,025 A | 2/1986 | Stephen |
| 4,575,189 A | 3/1986 | Johnson |
| 4,586,021 A | 4/1986 | Nickols |
| 4,586,454 A | 5/1986 | Hedquist et al. |
| 4,598,339 A | 7/1986 | Ainsworth |
| 4,623,954 A | 11/1986 | Schott et al. |
| 4,656,564 A | 4/1987 | Felder |
| 4,711,381 A | 12/1987 | Felder |
| 4,715,681 A | 12/1987 | Johnson |
| 4,716,502 A | 12/1987 | Schott et al. |
| 4,760,372 A | 7/1988 | Watson |
| 4,767,185 A | 8/1988 | Lyons |
| 4,779,169 A | 10/1988 | Cruze |
| 4,786,141 A | 11/1988 | Kitrell |
| 4,787,014 A | 11/1988 | Wodder et al. |
| 4,792,882 A | 12/1988 | Guevremont |
| 4,819,135 A | 4/1989 | Padilla et al. |
| 4,833,444 A | 5/1989 | Wisniewski |
| 4,852,970 A | 8/1989 | Kitrell |
| 4,852,971 A | 8/1989 | Kitrell |
| 4,860,177 A | 8/1989 | Simms |
| 4,875,142 A | 10/1989 | Spector |
| 4,876,981 A | 10/1989 | Barnhart |
| 4,878,734 A | 11/1989 | Trebnick |
| 4,901,209 A | 2/1990 | Nitz |
| 4,920,464 A | 4/1990 | Balentine |
| 4,967,179 A | 10/1990 | Solini |
| 5,008,782 A | 4/1991 | Murray |
| 5,014,641 A | 5/1991 | Johnson |
| 5,197,214 A | 3/1993 | Bseilis |
| 5,245,517 A | 9/1993 | Fenton |
| 5,247,431 A | 9/1993 | Liu |
| 5,276,593 A | 1/1994 | Lighthill et al. |
| 5,313,187 A | 5/1994 | Choi et al. |
| 5,349,920 A | 9/1994 | Koizumi |
| 5,361,718 A | 11/1994 | Cheng |
| 5,379,197 A | 1/1995 | Conyers et al. |
| 5,418,696 A | 5/1995 | Izzo, Sr. |
| 5,418,697 A | 5/1995 | Chiou |
| 5,448,402 A | 9/1995 | Lorenzana |
| 5,457,612 A | 10/1995 | Carter |
| 5,504,662 A | 4/1996 | Huang |
| 5,526,240 A | 6/1996 | Kuo |
| 5,544,027 A | 8/1996 | Orsano |
| 5,561,414 A | 10/1996 | Chin |
| 5,580,152 A | 12/1996 | Carter |
| 5,595,441 A | 1/1997 | McGee |
| 5,617,303 A | 4/1997 | Izzo, Sr. |
| 5,689,232 A * | 11/1997 | O'Shaughnessy et al. ... 340/468 |
| 5,702,172 A | 12/1997 | Kilburn |
| 5,739,750 A | 4/1998 | Drake |
| 5,754,097 A | 5/1998 | Vredenburgh |
| 5,765,936 A | 6/1998 | Walton et al. |
| 5,795,050 A | 8/1998 | Carter |
| 5,800,039 A | 9/1998 | Lee |
| 5,820,254 A | 10/1998 | Duenas |
| 5,823,653 A | 10/1998 | Elam, Jr. |
| 5,872,510 A | 2/1999 | O'Shaughnessy |
| 5,893,626 A | 4/1999 | Poling |
| 5,902,038 A | 5/1999 | Curry |
| 5,933,076 A | 8/1999 | Babb |
| 6,013,987 A | 1/2000 | Platt |
| 6,053,626 A | 4/2000 | Zagrodnik et al. |
| 6,059,431 A | 5/2000 | Ellis, Jr. |
| 6,072,386 A | 6/2000 | Yu |
| 6,099,151 A | 8/2000 | Tlustos |
| 6,109,770 A | 8/2000 | Choimet et al. |
| 6,217,204 B1 * | 4/2001 | Arima .......................... 362/551 |
| 6,308,590 B1 | 10/2001 | Berto |
| 6,320,499 B1 | 11/2001 | Wang |
| 6,336,736 B1 | 1/2002 | Edmond |
| 6,533,438 B2 | 3/2003 | Ter-Hovhannisian |
| 6,558,018 B1 | 5/2003 | Blum |
| 6,572,249 B2 | 6/2003 | Bailey |
| 6,690,266 B1 | 2/2004 | Jack et al. |
| 6,759,947 B2 | 7/2004 | Aceves |
| 6,779,913 B2 | 8/2004 | Niezrecki et al. |
| 6,805,473 B2 | 10/2004 | Beard |
| 6,808,298 B2 | 10/2004 | Christensen |
| 6,830,363 B2 | 12/2004 | Pisula |
| 6,932,498 B2 | 8/2005 | Miyazaki |
| 6,933,836 B2 | 8/2005 | Hsu |
| 6,976,446 B2 | 12/2005 | Benitez Manzano |
| 6,997,584 B1 | 2/2006 | Rothan et al. |
| 7,001,051 B2 | 2/2006 | Palmer et al. |
| 7,232,244 B2 | 6/2007 | Naylor |
| 7,281,831 B2 | 10/2007 | Kouchi et al. |
| 7,306,358 B2 | 12/2007 | Treat |
| 7,367,700 B2 | 5/2008 | Chasmar |
| 7,377,673 B1 | 5/2008 | Hsiao |
| 7,431,393 B1 | 10/2008 | Huang |
| 7,466,222 B2 | 12/2008 | Scott |
| 7,477,208 B2 | 1/2009 | Matlock et al. |
| 7,481,560 B1 | 1/2009 | Jaw |
| 7,500,770 B2 | 3/2009 | Medina |
| 7,585,095 B1 | 9/2009 | Sheriff |
| 7,621,549 B2 | 11/2009 | Van Houweling |
| 7,641,372 B2 | 1/2010 | Panopoulos |
| 7,717,595 B2 | 5/2010 | Fan |
| 7,722,231 B2 | 5/2010 | Carillo |
| 7,753,555 B2 | 7/2010 | Totani |
| 7,800,485 B2 | 9/2010 | Russell |
| 7,819,564 B2 | 10/2010 | Venier |
| 7,871,188 B1 | 1/2011 | Turby |
| 7,871,189 B2 | 1/2011 | Li |
| 7,883,248 B2 | 2/2011 | Kitamura |
| 7,891,849 B2 | 2/2011 | Campbell et al. |
| 7,901,118 B2 | 3/2011 | Chia-Li et al. |
| 7,950,835 B2 | 5/2011 | Carillo |
| 7,997,775 B2 | 8/2011 | Hurwitz |
| 8,016,462 B2 | 9/2011 | May |
| 8,033,559 B2 | 10/2011 | Grossman |
| 8,033,560 B2 | 10/2011 | Grossman |
| 8,038,332 B2 | 10/2011 | Lin |
| 2002/0093825 A1 | 7/2002 | Bailey |
| 2003/0067782 A1 | 4/2003 | Niezrecki et al. |
| 2003/0133308 A1 | 7/2003 | Christensen |
| 2004/0083633 A1 | 5/2004 | Mueller |
| 2004/0095776 A1 | 5/2004 | Pisula |
| 2004/0207520 A1 | 10/2004 | Chuang |

(56) References Cited

U.S. PATENT DOCUMENTS

| | | |
|---|---|---|
| 2005/0024884 A1 | 2/2005 | Seminara et al. |
| 2005/0275193 A1 | 12/2005 | Lee |
| 2006/0198154 A1 | 9/2006 | Naylor |
| 2006/0232988 A1 | 10/2006 | Wang et al. |
| 2007/0035956 A1* | 2/2007 | Topps .......................... 362/473 |
| 2007/0285934 A1 | 12/2007 | Carillo |
| 2008/0031002 A1 | 2/2008 | Venier |
| 2008/0101079 A1 | 5/2008 | Kitamura |
| 2008/0219014 A1 | 9/2008 | Loibl |
| 2009/0102627 A1 | 4/2009 | Russell |
| 2009/0268479 A1 | 10/2009 | Lunde |
| 2010/0002456 A1 | 1/2010 | Lin |
| 2010/0117811 A1 | 5/2010 | Liu |
| 2010/0225459 A1 | 9/2010 | Lee et al. |
| 2010/0283590 A1 | 11/2010 | Tee et al. |
| 2011/0037580 A1 | 2/2011 | Lin |
| 2011/0075403 A1 | 3/2011 | Niezrecki et al. |
| 2011/0115614 A1 | 5/2011 | Huang et al. |
| 2011/0235351 A1 | 9/2011 | Sherwin |
| 2011/0292667 A1* | 12/2011 | Meyers ......................... 362/465 |

* cited by examiner

ANTLIGHTS (TM) BICYCLE LIGHTS THAT SPAN A BILATERAL SAFETY ZONE

CROSS-REFERENCE TO RELATED APPLICATIONS

Not Applicable.

FEDERALLY SPONSORED RESEARCH

Not Applicable

SEQUENCE LISTING OR PROGRAM

Not Applicable

BACKGROUND

1. Field of Invention

This invention relates to the field of bicycle safety lighting.

2. Introduction

This invention is a novel system and method of bicycle safety lighting that can help to prevent bicyclists from being hit by a vehicle from behind during the evening or at night, especially when a bicyclist is stopped at an intersection. This invention may also prove useful for reducing the chances of bicyclists being hit by vehicles that are turning right at an intersection, at any time of the day.

3. Categorization and Limitations of the Prior Art

It can be challenging to classify the prior art concerning bicycle safety lights and reflectors into discrete categories, especially since examples of potentially relevant prior art number in the hundreds. However, such classification of the prior art into categories, even if imperfect, is an invaluable tool for reviewing the prior art, identifying the limitations of the prior art, and setting the stage for discussion of the advantages of the present invention that is disclosed in subsequent sections. Towards this end, I have identified eight general art categories, identified key limitations of art in these categories, and then identified examples of prior art which appear to be best classified into these eight categories.

The eight general categories that I will now discuss are as follows: (1) mainly side view—lights or reflectors on main frame, (2) mainly side view—lights or reflectors on wheels, (3) mainly front view—lights or reflectors on handlebar ends, (4) mainly side (or rear) view—lights or reflectors on pedals, (5) mainly rear (or side) view—lights or reflectors on vertical members, (6) mainly rear (or front) view—relatively narrow (eg. under one foot) lights or reflectors, (7) mainly rear (or front) view—relatively wide (eg. one foot or more) generally-rigid lights or reflectors, and (8) other relevant (but harder to categorize) lights and reflectors. For prior art in the eighth category, I discuss each of the examples individually.

Although the main focus of this present invention is on safety lighting for bicycles, I have also included relevant art concerning cycle lighting in general, including lighting for motorcycles and tricycles. It should be noted, however, that some forms lighting (especially lighting that is relatively heavy or bulky) can be useful for motorcycles, but impractical for human-powered bicycles. Also, although the main focus of this prevent invention is on safety lighting that highlights the presence of a bicycle from the perspective of someone approaching the bicycle from the rear, I have also included relevant art related to side-facing or front-facing bicycle safety lighting.

Although this section is labeled as one that discusses prior art, it is to be understood that creative discussion of the limitations of the prior art can highlight problems that are not yet solved by the prior art and, in so doing, foreshadow approaches to addressing these problems that would not be obvious from the prior art by itself. Sometimes the process of summarizing and analyzing problems in the prior art can add value by shedding light on worthwhile approaches to addressing these problems.

1. Mainly Side View: Lights or Reflectors on Main Frame

This first category of bicycle lights and reflectors in the prior art includes lights and reflectors that are attached to, or inserted within, members of the main frame of the bicycle (such as the top tube, head tube, down tube, and seat tube) in a generally-parallel manner so as to make the bicycle more visible from a side view. Such lights and reflectors can be attached, in parallel, to the main frame members using various methods, including clamps and adhesives. Lights can also be inserted into main frame members that are transparent or have holes in them, allowing light to shine out from within the interiors of these frame members. Such lights and reflectors are particularly useful for bringing the presence of the bicycle to the attention of a vehicle driver who is approaching the bicycle from the side (in a perpendicular manner) in the evening or at night. Such lights and reflectors can help to avoid side collisions between vehicles and bicycles. Although lights and reflectors in this category can be very useful in many respects, such lights and reflectors in the prior art do not provide good visibility of the bicycle from the perspective of a vehicle driver approaching the bicycle from the rear. Also, they do not visually define a bilateral safety zone around the bicycle which a vehicle should not enter.

Examples in the prior art that appear to comprise lights or reflectors attached to, or inserted within, the main frame of a cycle include the following: U.S. Pat. No. U.S. Pat. No. 4,088,882 (Lewis, "Fluorescent Bike Lamp"); U.S. Pat. No. 4,337,503 (Turner, "Handlebar Mounted Detachable Bicycle Light Fixture"); U.S. Pat. No. 4,819,135 (Padilla et al., "Bicycle Lighting Device"); U.S. Pat. No. 4,901,209 (Nitz, "Illuminated Bicycle Frame"); U.S. Pat. No. 5,765,936 (Walton et al., "Portable Neon Lighting System"); U.S. Pat. No. 5,823,653 (Elam Jr. et al., "Bicycle Illumination System"); U.S. Pat. No. 6,336,736 (Edmond, "Illuminated Bicycle Frame Apparatus"); U.S. Pat. No. 6,558,018 (Blum, "Vehicle Light Apparatus"); U.S. Pat. No. 6,779,913 (Niezrecki et al., "Cycle Illumination System"); U.S. Pat. No. 6,830,363 (Pisula, "Glow Tube Illumination Device and Illumination System for Bicycles"); U.S. Pat. No. 7,306,358 (Treat, "Swing Arm Taillight Assembly for a Motorcycle"); U.S. Pat. No. 7,883,248 (Kitamura, "Bicycle Illumination Apparatus"); and U.S. Pat. No. 7,997,775 (Hurwitz, "High Visibility Safety Lighting System Integrated Within a Vehicle's Frame"); as well as U.S. Patent Applications 20030067782 (Niezrecki et al., "Cycle Illumination System"); 20040095776 (Pisula, "Glow Tube Illumination Device and Illumination System for Bicycles"); and 20080101079 (Kitamura, "Bicycle Illumination Apparatus").

2. Mainly Side View: Lights or Reflectors on Wheels

This second category of bicycle lights and reflectors in the prior art includes lights and reflectors that are attached to bicycle wheels in a manner that is generally parallel to the wheels, often attached to the spokes, so as to make the bicycle more visible from a side view. One of advantage of such lights is that the vast majority of them move as the wheels turn. Although this does not provide light movement when a bicycle is stopped, it is a useful feature for drawing the attention of a vehicle driver to the presence of a bicycle.

There are a variety of such lights attached to wheels in the prior art, including flashing lights and lights that create patterns or spell out messages as the wheels turn. Such lights and reflectors are useful for alerting a vehicle driver who is approaching the bicycle from the side in order to help avoid side collisions between vehicles and bicycles. Lights that create patterns or spell out messages can also serve entertainment purposes. However, such devices in the prior art do not provide good visibility of the bicycle from the perspective of a vehicle driver approaching the bicycle from the rear. Also, they do not visually define a bilateral safety zone around the bicycle which a vehicle should not enter.

Examples in the prior art that appear to comprise lights or reflectors attached to the sides of cycle wheels, especially to wheel spokes, include the following: U.S. Pat. No. 3,987,409 (Freeman, "Vehicle Signal Light"); U.S. Pat. No. 4,787,014 (Wodder et al., "Spoke Mounted Bicycle Light"); U.S. Pat. No. 5,418,697 (Chiou, "Signal Lamp Assembly for Bicycles"); U.S. Pat. No. 5,800,039 (Lee, "Warning Device for Bicycle Having Changeable Patterns"); U.S. Pat. No. 6,072,386 (Yu, "Bicycle Spoke Warning Light Device Capable of Setting and Displaying Characters"); and U.S. Pat. No. 7,477,208 (Matlock et al., "Rotational Light Emitting Display Apparatus"); as well as U.S. Patent Application 20100002456 (Lin, "Bicycle Reflector").

3. Mainly Front View: Lights or Reflectors on Handlebar Ends

This third category of bicycle lights and reflectors in the prior art includes lights and reflectors that are attached to the ends of the handlebars without extending outwards by a substantive distance. Lights and reflectors that extend outwards by a substantive distance are classified in subsequent categories because they have the potential to span a bilateral safety zone that may be visible from behind the bicycle. Most of the lights or reflectors attached to, or inserted within, handlebar ends provide increased visibility for safety purposes. Some of the lights also function as turn signal indicators. Such lights and reflectors have their purposes, but they do not provide good visibility of the bicycle from the perspective of a vehicle driver approaching the bicycle from the rear. Also, they do not do a good job of defining a bilateral safety zone for the following reasons. From the perspective of someone behind the bicycle, their light can be blocked by the bicyclist's hands or torso. Also, they often direct light beams frontwards or sideways, not backwards. Also, handlebar ends can point away from the rear of the bicycle as the handlebars are turned to the right or left.

Examples in the prior art that appear to comprise lights or reflectors attached to the ends of cycle handlebars include the following: U.S. Pat. No. 2,416,160 (Davidsson, "Signaling Device for Cycles"); U.S. Pat. No. 2,469,944 (Bauters, "Signaling Device for Cycles and the Like"); U.S. Pat. No. 2,603,701 (Schadel Jr., "Signal Light for Bicycle Handle Bars"); U.S. Pat. No. 2,793,284 (Simoneit, "Bicycle Safety Lights"); U.S. Pat. No. 4,623,954 (Schott et al., "Handlebar Safety Light"); U.S. Pat. No. 4,656,564 (Felder, "Bicycle Handlebar Light"); U.S. Pat. No. 4,716,502 (Schott et al., "Handlebar Safety Light"); U.S. Pat. No. 4,779,169 (Cruze, "Cycle Hand Grip with Running Light"); U.S. Pat. No. 4,875,142 (Spector, "Bicycle Safety Lights"); U.S. Pat. No. 5,247,431 (Liu, "Indicating Light for Cycles"); U.S. Pat. No. 6,308,590 (Berto, "Handlebar Device"); U.S. Pat. No. 7,377,673 (Hsiao, "Safety Light"); U.S. Pat. No. 7,481,560 (Jaw, "Handgrip with Lamp Apparatus for Bicycle"); U.S. Pat. No. 7,717,595 (Fan, "Brake Warning Apparatus for Bicycles"); U.S. Pat. No. 7,871,189 (Li, "Warning Lamp and Handlebar Assembly for Bicycle"); U.S. Pat. No. and 7,891,849 (Campbell et al., "Light Emitting Hand Grip, Foot Peg or Foot Rest for a Cycle").

4. Mainly Side (or Rear) View: Lights or Reflectors on Pedals

This fourth category of bicycle lights and reflectors in the prior art includes lights and reflectors that are attached to, or inserted within, the bicycle pedals. Like lights or reflectors that move with wheel rotation, these lights or reflectors move with bicycle movement. This is a useful feature. These lights are most visible from the side, but are also potentially of some value from a rear view or from a front view because pedals stick out laterally, to some extent, from the main body of the bicycle. On the downside, however, pedal lights or reflectors are relatively low to the road and thus not easily visible from behind. Also, they do not stick out sufficiently far from the bicycle so as to define a wide bilateral safety zone that a vehicle should not enter. By the time a vehicle enters the space defined by a pedal-mounted light or reflector, the vehicle already has a high likelihood of harming the bicyclist's leg or foot. On balance, pedal-mounted lights and reflectors may be useful for avoiding side collisions, but they do not provide good visibility of the bicycle from the perspective of a vehicle driver approaching the bicycle from the rear and do not define a complete bilateral safety zone around the bicycle.

Examples in the prior art that appear to comprise lights or reflectors attached to, or inserted within, cycle pedals include the following: U.S. Pat. No. 5,702,172 (Kilburn, "Light Emitting Bicycle Pedal"); U.S. Pat. No. 5,902,038 (Curry, "Lighted Bicycle Pedal"); U.S. Pat. No. 7,891,849 (Campbell et al., "Light Emitting Hand Grip, Foot Peg or Foot Rest for a Cycle"); and U.S. Pat. No. 7,901,118 (Chia-Li et al., "Luminous Pedal for a Bicycle"); as well as U.S. Patent Application 20090268479 (Lunde, "Lighted Bicycle Pedal").

5. Mainly Rear (or Side) View: Lights or Reflectors on Vertical Members

This fifth category of prior art includes a variety of lights, reflectors, flags and other visibility-enhancing members that are attached to, or inserted within, a vertical member such as a pole or mast that is vertically attached to a bicycle. Such vertical members in the prior art are almost always attached to the rear half of a bicycle—such as the rear wheel axle, real wheel fender, seat, or seat post. Due to their rear half location, lights or reflectors on such vertical members are particularly useful for highlighting the visibility of the bicycle from the perspective of someone who is approaching the bicycle from the rear. However, especially for lights and reflectors mounted on top of relatively-high poles or masts, such devices can also provide some improved visibility of the bicycle from side and front perspectives.

In some examples of such art, there is a single light, reflector, or flag at the top of a pole or mast. In other examples, there may be lights or reflectors along the entire vertical axis of the pole. In other examples, there are secondary members attached to a vertical member in a perpendicular manner, with lights or reflectors on the ends thereof. In some examples, the only movement of the lights or reflectors is due to the swaying motion of the bicycle frame and pole as the bicycle is pedaled. Such movement stops when the bicycle stops. In other examples, flashing light motion or other apparent light motion may be caused by movement of a light-diverting member, such as a pinwheel, that is moved by air motion. In other examples, a pole may be moved by direct mechanical connection to a bicycle wheel or pedal.

Although such vertically-mounted devices in the prior art can somewhat improve the visibility of a bicycle from the perspective of a vehicle driver approaching the bicycle from the rear, such devices still have limitations for this purpose. Such devices do not consistently define a wide bilateral safety zone around the bicycle that the vehicle should not enter. The vast majority of such devices do not create any lateral light movement at all and do not create a bilateral safety zone around the bicycle. Even for those devices that comprise poles that can sway back and forth with bicycle motion, thus creating limited lateral movement of a light or reflector as the bicycle moves and sways, this movement is of limited width and stops when the bicycle stops. This is very unfortunate because a bicyclist can be most vulnerable to collision from a vehicle approaching it from the rear when the bicycle is stopped at an intersection during the evening or at night. The lateral span of such devices is limited by a fundamental problem with relatively-rigid light-supporting members in the prior art; if a rigid device sticks out too far to the side from the bicycle, it can snag on something and break, or cause an accident.

Examples in the prior art that appear to comprise lights, reflectors, or flags attached to a vertical member extending upwards from a cycle include the following: U.S. Pat. No. 3,586,348 (Rich, Jr., "Bicycle Sign, Seat Brace Means"); U.S. Pat. No. 3,696,334 (Demeter, "Vehicle Warning Lamp Device"); U.S. Pat. No. 3,812,815 (Kuenzel, "Safety Attachment"); U.S. Pat. No. 3,862,410 (Maxwell, "Bicycle Warning Light"); U.S. Pat. No. 3,878,810 (Conrad, "Vehicle Mounted Safety Warning Device and Bracket Therefor"); U.S. Pat. No. 3,890,497 (Rush, "Illuminated Safety Pole for Bicycles or the Like"); U.S. Pat. No. 3,916,377 (Demeter, "Vehicle Safety Warning Device"); U.S. Pat. No. 3,974,369 (Chmela et al., "Impulse Operating Flashing Beacon"); U.S. Pat. No. 4,011,443 (Smith et al., "Motorcycle Indicating Safety Light Assembly"); U.S. Pat. No. 4,023,032 (Taylor, Deceased et al., "Light Standard for Bicycles"); U.S. Pat. No. 4,027,150 (Dean, "Safety Light"); U.S. Pat. No. 4,041,452 (Moya, "A Rotating Beacon for a Bicycle"); U.S. Pat. No. 4,049,959 (Ledterman, "Overhead Bike Light"); U.S. Pat. No. 4,051,361 (Lichon et al., "Vehicle Identification Signal Device"); U.S. Pat. No. 4,088,882 (Lewis, "Fluorescent Bike Lamp"); U.S. Pat. No. 4,103,924 (Suhm, "Vehicle Safety Device"); U.S. Pat. No. 4,157,075 (Kirvutza, "Bicycle Signal Device"); U.S. Pat. No. 4,201,975 (Marcus, "Display Device"); U.S. Pat. No. 4,274,127 (Beck et al., "Vehicle Safety Illumination Device"); U.S. Pat. No. 4,309,741 (Smith, "Flasher"); U.S. Pat. No. 4,598,339 (Ainsworth, "Light Wand Assembly for Bicycles, Motorbikes, Etc."); U.S. Pat. No. 4,876,981 (Barnhart, "Bicycle Safety Flag"); U.S. Pat. No. 5,448,402 (Lorenzana, "Bicycle Light Reflector"); U.S. Pat. No. 6,533,438 (Ter-Hovhannisian, "Bicycle or Scooter Safety Light"); and U.S. Pat. No. 7,367,700 (Chasmar, "Safety Whip Mast"); as well as U.S. Patent Applications 20040083633 (Mueller, "Lighted Support Pole and Banner") and 20070035956 (Topps, "Lighted Rod Assembly and Method of Use").

6. Mainly Rear (or Front) View: Relatively Narrow (eg. Under 1') Lights or Reflectors This sixth category of prior art includes a variety of lights and reflectors that are relatively-centrally located with respect to the main longitudinal (front-to-back) axis of the bicycle and are relatively narrow in width. For example, as best can be discerned from the patents, devices in this category appear to have a width of less than one foot. In this respect, such devices generally function as a relatively-central light source (either light emitting or reflecting) rather than as an array of light sources that span a complete bilateral safety zone around the bicycle. We have classified devices that appear to span more than one foot, and may possibly define a bilateral safety zone around the bicycle, in a subsequent category. Lights and reflectors in this present category generally face frontwards or backwards, or both, with respect to the main longitudinal axis of the bicycle. Due to the focus of this present invention on avoiding collisions with vehicles approaching from the rear of the bicycle, this review is predominantly focused on lights and reflectors that face backwards. However, it does include some forward-facing lights.

There is a relatively wide variety of lights and reflectors in this category. There is variation in the configuration, plurality, color, type, and functionality of such lights. Some lights are basic safety lights that are on all the time. Other lights function primarily as brake lights, or turn signal lights, that are only illuminated at particular times to signal particular events. Some of the devices have no movement apart from the swaying of the bicycle frame to which they are attached. Other devices are moved (e.g. rotated, wagged, or wobbled) by the motion of the bicycle wheels or by air currents. Some of the devices do not include light sources, only light reflectors. Some of the devices, especially those involving a series or matrix of LED lights, create patterns or spell messages.

In various examples, such relatively-narrow lights and reflectors may be mounted on: the seat, the seat post, the rear wheel axle, the rear wheel fender, and a rear-facing bike rack. Since these devices do not stick out very far from the central axis of the bicycle, there is not much danger of their snagging on something and breaking, or causing an accident. Accordingly, virtually all of the devices in this category are relatively rigid in construction. Although lights and reflectors in this category can be useful for bicycle safety, due to their limited width they do not define a substantive bilateral safety zone around the bicycle that a vehicle should not enter.

Examples in the prior art that appear to comprise lights or reflectors, mounted on the back or front of a cycle, that are relatively narrow (eg. less than a foot in width) include the following: U.S. Pat. No. 2,233,039 (Vianzone, "Electric Lighting Device for Bicycles and Similar Road Vehicles"); U.S. Pat. No. 2,694,138 (Schwinn, "Back Light for Use on Cycles and the Like"); U.S. Pat. No. 2,788,763 (Ries, "Wig-Wag Bicycle Light"); U.S. Pat. No. 2,797,621 (Galden, "Rotary Reflector"); U.S. Pat. No. 3,099,243 (Schwartz et al., "Moving Signal Accessory for Bicycles"); U.S. Pat. No. 3,478,713 (Brames, "Warning Device"); U.S. Pat. No. 3,528,721 (Lalonde, "Bicycle Safety Signal"); U.S. Pat. No. 3,887,900 (Goedert, "Rotating Bicycle Signal and Drive Therefor"); U.S. Pat. No. 4,019,171 (Martelet, "Safety Lighting System"); U.S. Pat. No. 4,046,098 (Mancinelli et al., "Rotatable Multi-Surface Reflectors for Bicycles"); U.S. Pat. No. 4,046,397 (Kitrell, "Reflector Device for Bicycles"); U.S. Pat. No. 4,099,159 (Windisch, "Light Signalling Device for Bicycles"); U.S. Pat. No. 4,099,222 (Cornell et al., "Bicycle Safety Light"); U.S. Pat. No. 4,105,286 (Curran, "Bicycle Reflector Assembly"); U.S. Pat. No. 4,108,535 (Slaughter, "Safety Device for Bicycle"); U.S. Pat. No. 4,113,351 (Kitrell, "Safety Reflector Device for Bicycles or the Like"); U.S. Pat. No. 4,115,942 (Sears, "Message Display Arrangement for Bicycle or Like Vehicle"); U.S. Pat. No. 4,145,989 (Hatcher, "Oscillating Signal for Bicycles"); U.S. Pat. No. 4,290,048 (Cutlip et al., "Turn Signaling Apparatus"); U.S. Pat. No. 4,417,783 (Le Vantine, "Pulsating, Oscillating Bicycle Reflector"); U.S. Pat. No. 4,495,553 (Haynes, "Vehicle Light Assembly"); U.S. Pat. No. 4,571,025 (Stephen, "Reflective System for Bicycles"); U.S. Pat. No. 4,586,021 (Nickols, "Bicycle Braking Indicator Light Assembly"); U.S. Pat. No. 4,711,381 (Felder, "Bicycle Rack with Safety Light"); U.S. Pat. No. 4,767,185 (Lyons, "Rotating Multicolored Air Driven Reflector"); U.S. Pat. No. 4,786,141 (Kitrell, "Visual Signal Device Including an Expandable Bellows-Like Element"); U.S. Pat. No. 4,792,882 (Guevremont, "Bike Brake Light"); U.S. Pat. No. 4,833,444 (Wisniewski, "Bicycle Brake Light System"); U.S. Pat. No. 4,852,970 (Kitrell, "Visual Signal Device for a Bicycle"); U.S. Pat.

No. 4,852,971 (Kitrell, "Fender Mounted Visual Signal Device for a Bicycle"); U.S. Pat. No. 4,860,177 (Simms, "Bicycle Safety Light"); U.S. Pat. No. 4,878,734 (Trebnick, "Bicycle Wheel Activated Reflector"); U.S. Pat. No. 4,920,464 (Balentine, Iii, "Bicycle Brake Light"); and U.S. Pat. No. 4,967,179 (Solini, "Saddle for Cycles, Motor Cycles and the Like").

Prior art that appears to be in this category also includes: U.S. Pat. No. 5,014,641 (Johnson, "Hazard Warning Device for Vehicles"); U.S. Pat. No. 5,245,517 (Fenton, "Lighted Bicycle Carrier Bags"); U.S. Pat. No. 5,313,187 (Choi et al., "Battery-Powered Flashing Superluminescent Light Emitting Diode Safety Warning Light"); U.S. Pat. No. 5,361,718 (Cheng, "Reflective Warning Device for Wheeled Vehicles"); U.S. Pat. No. 5,457,612 (Carter, "Bicycle Rear Lighting System"); U.S. Pat. No. 5,504,662 (Huang, "Safety Bicycle Saddle Flashing Light Device"); U.S. Pat. No. 5,526,240 (Kuo, "Bicycle Stop Light"); U.S. Pat. No. 5,544,027 (Orsano, "LED Display for Protective Helmet and Helmet Containing Same"); U.S. Pat. No. 5,561,414 (Chin, "Bicycle Warning Signal Control Device"); U.S. Pat. No. 5,739,750 (Drake, "Brake Light for Bicycle"); U.S. Pat. No. 5,893,626 (Poling, "Safety Light with Colorful Rotating Illumination Pattern"); U.S. Pat. No. 6,013,987 (Platt, "Moving Lights Simulator"); U.S. Pat. No. 6,059,431 (Ellis, Jr., "Wheel Mounted Safety Light"); U.S. Pat. No. 6,109,770 (Choimet et al., "Illuminating or Light Signaling Device, Particularly for Bicycles and the Like"); U.S. Pat. No. 6,320,499 (Wang, "Brake Signal Sensor Device"); U.S. Pat. No. 6,572,249 (Bailey, "Bicycle Light with LED Array"); U.S. Pat. No. 6,690,266 (Jack et al., "Signaling Light Attachment for Bicycles"); U.S. Pat. No. 6,759,947 (Aceves, "Moving Vehicle Comfort, Security and Safety Signaling System"); U.S. Pat. No. 6,932,498 (Miyazaki, "Vehicular Lamp"); U.S. Pat. No. 6,933,836 (Hsu, "Bike Braking Warning Control"); U.S. Pat. No. 6,997,584 (Rothan et al., "Bicycle Lamp"); U.S. Pat. No. 7,001,051 (Palmer et al., "Human Powered Vehicle Safety Lighting Structures"); U.S. Pat. No. 7,281,831 (Kouchi et al., "Direction Indicators for Vehicles"); U.S. Pat. No. 7,431,393 (Huang, "Bicycle Saddle Mount with Light Device"); U.S. Pat. No. 7,621,549 (Van Houweling, "Bicycle Light System"); U.S. Pat. No. 7,641,372 (Panopoulos, "Machine Providing for an Advanced Headlamp System with Peripheral Beam Technology"); U.S. Pat. No. 7,722,231 (Carillo, "Bicycle Safety Lighting"); U.S. Pat. No. 7,753,555 (Totani, "Vehicle-Mounted LED Illumination Device"); U.S. Pat. No. 7,819,564 (Venier, "Bicycle Lighting System"); U.S. Pat. No. 7,871,188 (Turby, "Motorcycle Rider Illuminating System"); and U.S. Pat. No. 7,950,835 (Carillo, "Bicycle Safety Lighting").

Finally, examples of such devices in the prior art also appear to include: U.S. Patent Applications 20020093825 (Bailey, "Bicycle Light with LED Array"); 20040207520 (Chuang, "Turn Signal of Bicycle"); 20050024884 (Seminara et al., "Illuminated Personal Safety Device for Use by Cyclists and Joggers"); 20060232988 (Wang et al., "Emitting Light Device for Bicycles"); 20070285934 (Carillo, "Bicycle Safety Lighting"); 20080031002 (Venier, "Bicycle Lighting System"); 20100117811 (Liu, "Direction Signal Light"); 20100225459 (Lee et al., "Bicycle Display Lamp Structure"); 20110037580 (Lin, "Traffic Warning Device"); 20110075403 (Niezrecki et al., "Safety Device for Illuminating Sports Enthusiasts"); and 20110235351 (Sherwin, "Apparatus To Provide Variable Illuminated Signals for the Presence of Bicycles and Other Vehicles").

7. Mainly Rear (or Front) View: Relatively-Wide (eg. 1' or More) Generally-Rigid Lights or Reflectors This seventh category of prior art includes a variety of lights and reflectors that extend laterally outwards from the main longitudinal (front-to-back) axis of the bicycle and, as best can be discerned from the patents, may potentially have a width of a foot or more. In this respect, they have the potential to define a substantive bilateral safety zone around the bicycle that is visible from drivers approaching the bicycle from the rear. However, the prior art does not fully live up to this potential due to a central construction problem that is not resolved in the prior art. Rigid light-supporting members, that stick out some distance on each side of the bicycle, could potentially define a full bilateral safety zone around the bicycle that a vehicle should not enter and which can be seen by a driver approaching the rear of the bicycle. However, rigid members that stick out over a foot in distance from a bicycle can snag on external objects (such as trees, posts, and pedestrians) and break, or cause an accident.

Some prior art has sought to resolve this problem by supplementing a generally-rigid, straight, laterally-extending member with a single flexible spring joint—generally near where it connects to the bicycle. Such a spring joint can decrease, but does not eliminate, potential damage from collision with an external object. Having only one deflection point along the entire longitudinal axis of the laterally-extending generally-rigid member limits the member's ability to absorb energy from collision with an external object without causing damage to the external object, to the rigid member, or both. Also, such a single-joint configuration is limited in terms of the width of the bilateral safety zone that can be spanned. With a relatively-wide generally-rigid spanning member, the device must be constructed with a relatively strong (inflexible) spring in order to keep the rigid part from drooping downward. This is particularly true if a light is attached to the end of the rigid member.

Some of the devices in this category seek to resolve this dilemma by having a friction-based hinge or ball-joint where the generally-rigid member attaches to the bicycle, instead of a flexible spring joint. This can avoid some of the problems associated with a spring joint, but creates other problems. For example, hinges only allow motion at certain angles and can break if collision with an external object causes torque at other angles. For example, some of the hinges in the prior art only allow a rigid member to fold upwards or downwards—and would break if hit front-to-back by an external object such as a post, tree, car, or pedestrian.

Also, hinges and ball joints without springs are non-resilient. This is by design so that their position (outward angle, etc.) can be adjusted by the bicyclist. However, non-resiliency has a downside. Once the generally-rigid, laterally-extending member is deflected (backwards and/or inwards) by collision with an external object, it does not automatically return to its original configuration. Even if the rigid member is not broken by such a collision, it must be manually moved back into place by the bicyclist. At a minimum, this is inconvenient for the bicyclist who must stop to move the rigid member back into place. At worst, this is hazardous for the bicyclist. For example, if the bicyclist is intent on what is ahead and does not notice that a laterally-extending member has been bent backwards and/or inwards, and does not stop to move it back into place, then the bicycle is no longer protected by the bilateral safety zone of light during this time (and is more vulnerable to collision from a vehicle).

For all of these reasons, there are limitations to generally-rigid relatively-wide lights and reflectors in this category in the prior art. Although lights and reflectors in this category in the prior art could be a step toward defining a bilateral safety zone around a bicycle that can be seen by drivers approaching the bicycle from the rear, they are limited because they cause accidents if they are too wide. They also tend to be dependent on a single spring joint and/or have a friction-based joint that is non-resilient. The novel invention that we will disclose herein overcomes these limitations of the prior art in this category.

Examples in the prior art that appear to comprise lights or reflectors, mounted on the back or front of a cycle, that are relatively wide (eg. at least a foot in width) include the following: U.S. Pat. No. 1,994,837 (St. Onge, "Bicycle Construction"); U.S. Pat. No. 2,153,634 (Magarian, "Signaling Arm"); U.S. Pat. No. 2,540,394 (Hollingsworth, "Direction and Safety Signal for Motorcycles"); U.S. Pat. No. 3,907,404 (Mcewin, "Safety Reflector for Bicycle"); U.S. Pat. No. 3,944,255 (Martinson, "Safety Device"); U.S. Pat. No. 3,945,336 (Harris, "Bicycle Distance Safety Device"); U.S. Pat. No. 3,950,727 (Smith, "Fold-Away Rear Turn Indicators for Motorcycles"); U.S. Pat. No. 3,961,596 (Schiavone, "Bicycle Directional Signal"); U.S. Pat. No. 3,967,575 (Coutts, "Bicycle Safety Warning Flag"); U.S. Pat. No. 3,972,302 (Sherman, "Velocipede Presence Indicating Device"); U.S. Pat. No. 3,982,771 (Tropeano, "Safety Guard Attachment for Bicycles and Other Two-Wheel Vehicles"); U.S. Pat. No. 4,020,458 (Windisch, "Light Signalling Device for Bicycles and Switch Therefor"); U.S. Pat. No. 4,038,935 (Margiloff, "Traffic Signaling Attachment Device for Bicycles"); U.S. Pat. No. 4,116,154 (Harris, "Bicycle Distance Safety Device"); U.S. Pat. No. 4,204,191 (Daniels, "Lighting System for Bicycles"); U.S. Pat. No. 4,319,307 (Turner, "Illuminated Handlebar"); U.S. Pat. No. 4,321,883 (Ruppa, "Safety Flag Attachment Means for Bicycles, Etc."); U.S. Pat. No. 4,342,280 (Ashworth, "Bicycle and Motor Bike Warning Signal Device"); U.S. Pat. No. 4,365,581 (Margiloff, "Traffic Signaling Attachment Device for Bicycles"); U.S. Pat. No. 4,422,615 (Mcmanus, "Flexible Reflector Assembly for Bicycles and the Like"); U.S. Pat. No. 4,483,586 (Sisto, "Safety Spacer"); U.S. Pat. No. 4,575,189 (Johnson, "Bicycle Reflector Safety Device"); U.S. Pat. No. 4,586,454 (Hedquist et al., "Distance Stick"); U.S. Pat. No. 4,715,681 (Johnson, "Bicycle Reflector for Handlebar Attachment"); and U.S. Pat. No. 4,760,372 (Watson, "Bicycle Indicator System").

Prior art in this categories also appears to include: U.S. Pat. No. 5,008,782 (Murray, "Lighted Handlebar for Bicycles"); U.S. Pat. No. 5,197,214 (Bseilis, "Pendulous Security Device"); U.S. Pat. No. 5,276,593 (Lighthill et al., "Bicycle Light Signal"); U.S. Pat. No. 5,349,920 (Koizumi, "Safety Reflector Marker"); U.S. Pat. No. 5,379,197 (Conyers et al., "Lighted Bicycle Safety Device"); U.S. Pat. No. 5,418,696 (Izzo Sr., "Bicycle Mounted Turn-Signal and Horn"); U.S. Pat. No. 5,580,152 (Carter, "Bicycle Handlebar Light"); U.S. Pat. No. 5,595,441 (Mcgee, "Portable Safety Lighting Device and Method for Increasing Visibility of a Person or Vehicle"); U.S. Pat. No. 5,617,303 (1770 Sr., "Turn Signal and Horn Assembly for a Bicycle"); U.S. Pat. No. 5,754,097 (Vredenburgh, "Conspicuous Lighting Display System for Motorcycles"); U.S. Pat. No. 5,795,050 (Carter, "Bicycle Handlebar Light"); U.S. Pat. No. 5,820,254 (Duenas, "Removable Motorcycle Light"); U.S. Pat. No. 5,933,076 (Babb, "Retrofittable Bicycle Turn Indicator"); U.S. Pat. No. 6,053,626 (Zagrodnik et al., "Motorcycle Directional Light Bar"); U.S. Pat. No. 6,099,151 (Tlustos, "Lighting System at Rear Part of Motorcycles"); U.S. Pat. No. 6,805,473 (Beard, "Bicycle Light"); U.S. Pat. No. 6,808,298 (Christensen, "Lighting System"); U.S. Pat. No. 7,232,244 (Naylor, "Vehicle Safety Warning Signal Devices and System for Use on a Bicycle, Motorcycle or Like Vehicle"); U.S. Pat. No. 7,466,222 (Scott, "Elevated Motorcycle Signal Lights"); U.S. Pat. No. 7,500,770 (Medina, "Motorcycle Tail Light Assembly"); U.S. Pat. No. 7,585,095 (Sheriff, "Illuminated Motorcycle Safety and Vanity Light Bar"); U.S. Pat. No. 7,800,485 (Russell, "Bicycle Turn Signals"); U.S. Pat. No. 8,016,462 (May, "Motorcycle Adjustable Light Bar Assembly"); U.S. Pat. No. 8,033,559 (Grossman, "Human-Propelled Vehicles"); U.S. Pat. No. 8,033,560 (Grossman, "Human-Propelled Vehicle"); and U.S. Pat. No. 8,038,332 (Lin, "Viewing and Lighting Device"); as well as U.S. Patent Applications 20030133308 (Christensen, "Lighting System"); 20050275193 (Lee, "Vehicle Safety Lighting and Signaling System"); 20060198154 (Naylor, "Vehicle Safety Warning Signal Devices and System for Use on a Bicycle, Motorcycle or Like Vehicle"); and 20090102627 (Russell, "Bicycle Turn Signals").

8. Other Relevant (but Harder to Categorize) Lights and Reflectors

Examples in the prior art that appear to comprise bicycle lights or reflectors that are relevant, but are more difficult to classify into the above categories, include the following: U.S. Pat. No. 3,945,337 (Sweetman, "Safety Arch"); U.S. Pat. No. 4,085,317 (Mithoff, "Motorcycle Safety Light"); U.S. Pat. No. 5,689,232 (O'Shaughnessy et al., "Vehicle Signaling Device"); U.S. Pat. No. 5,872,510 (O'Shaughnessy, "Bicycle Direction Indicator"); U.S. Pat. No. 6,976,446 (Manzano, "Adjustable Safety Distance Spacer for Bicycles"); 20080219014 (Loibl, "Bicycle Bumper with a Light Generating a Bike Lane"); 20100283590 (Tee et al., "Safety Light Device"); 20110115614 (Huang et al., "Direction Light and Illumination Device for Bicycle"). In this section, each of these examples is now discussed individually.

U.S. Pat. No. 3,945,337 (Sweetman, "Safety Arch") appears to disclose an arch that is attached to bicycle handlebars (or some other front portion of the bicycle) that has a width approximately equal to that of the handlebars and features reflective, illuminative, or decorative attachments to make the bicycle more visible. This device could be useful for highlighting the bicycle for drivers approaching the bicycle from the front, but due to its forward orientation it is less useful for highlighting the bicycle for drivers approaching the bicycle from the rear. Portions of the arch will be obscured by the body of the bicyclist as seen from a rear perspective. Also, the width of the device appears to be generally constrained by the width of the handlebars, which may not define a full bilateral safety zone around the bicycle. Finally, since the arch is in front of the bicyclist's face, it may hazardously interfere with the bicyclist's vision.

U.S. Pat. No. 4,085,317 (Mithoff, "Motorcycle Safety Light") appears to disclose an elevated elliptical lighted globe that is supported by a plurality of structural columns attached to an adjustable sub-frame. In some respects, this device may be viewed as a hybrid between the above art category with lights and reflectors on vertical members and the above art category with relatively-wide lights or reflectors. It appears to be a bit large and weighty for use on a bicycle, which would explain its primary intended use for a motorcycle, but it merits discussion for this application. If a light-weight version of it could be adapted for use on a bicycle, then it could be useful for alerting drivers from all sides to the presence of the bicycle. However, it appears to be generally rigid and bulky and could cause an accident if it were made sufficiently wide to span a full bilateral safety zone around a bicycle.

U.S. Pat. No. 5,689,232 (O'Shaughnessy et al., "Vehicle Signaling Device") and U.S. Pat. No. 5,872,510 (O'Shaughnessy, "Bicycle Direction Indicator") appear to disclose flexible arms, with lights on the end of each arm, that are attached to the handlebars of a bicycle. These devices may be useful for highlighting the bicycle for drivers approaching the bicycle from the front, but they have limitations. They are less useful for highlighting the bicycle for drivers approaching the bicycle from the rear. From a rear perspective at certain angles, the lights at the ends of the arms will be obscured by the body of the bicyclist. Also, the use of lights only at the ends of the arms does not enable the creation of sequences of laterally flashing lights visible from someone approaching the bicycle from the rear.

Further, these devices are not resilient. The latter patent says that the arms "may be used to position and to hold the lamps at selected positions." Although the attribute of adjustability may be desirable for focusing end lights in desired directions, it comes at the price of resiliency which would be desirable for maintaining a bilateral safety zone after deflection from collision with an external object. The arms in this device appear to be adjustable, not resilient. They would require manual readjustment to their original configuration after being deflected by collision with an external object.

U.S. Pat. No. 6,976,446 (Manzano, "Adjustable Safety Distance Spacer for Bicycles") appears to disclose a one-sided laterally-extending spacer rod, with a reflector on the end, which is perpendicular to the main longitudinal (front-to-back) plane of the bicycle and is adjustable in length. The adjustable length aspect of this spacer is a useful feature. However, this device does not disclose a bilateral safety zone around a bicycle which may be seen from someone approach the bicycle from the rear. Also, it also does not provide details concerning how one or more lights might be incorporated into this device. Also, it does not disclose the extent to which this device is flexible or resilient with respect to collision with an external object. Further, its perpendicular configuration with respect to the bicycle frame and the bulbous reflector on its end raise questions concerning what would happen with such a collision, especially if such contact were to occur along a portion of its longitudinal axis that is relatively close the bicycle. Would the rod bend or break with such contact? Would the bulbous reflector snag or break? The invention to be disclosed herein addresses and resolves these issues.

U.S. Patent Applications 20080219014 (Loibl, "Bicycle Bumper with a Light Generating a Bike Lane") and 20100283590 (Tee et al., "Safety Light Device") both confirm the importance of defining a lateral safety zone around a bicycle and the difficulty of doing this with a rigid member extending out from the side of a bicycle. These inventions both appear to seek to address this problem by projecting beams of light down onto the ground in order to create a virtual bike lane via light beams. This is an innovative approach to an important problem. However, it has limitations. The most important limitation of this approach is that the safety zone is created on ground level, rather than in the upper-rear quadrant of the space around the bicycle where it would be more visible to a vehicle driver who is approaching the bicycle from the rear. Also, since the safety zone is entirely virtual (defined by light beams rather than any solid matter), this approach does not offer the option of tactile or auditory warnings of vehicle proximity upon contact. As we will disclose in this invention, the latter is possible when a physically-solid member, such as a laterally-extending light-holding member, is used to define the safety zone rather than just a virtual beam of light projected onto the ground.

U.S. Patent Application 20110115614 (Huang et al., "Direction Light and Illumination Device for Bicycle") appears to disclose turn signal lights at the ends of arms that can be mounted on either the front or the back of a bicycle.

One embodiment of this invention appears to comprise generally-rigid arms that support lights at their ends. This rigid version has the limitations associated with generally-rigid, laterally-extending members that have been discussed in previous categories. Another embodiment of this invention appears to offer laterally-extending arms with lights on their ends wherein these arms are comprised of a series of friction joints. Such arms can be configured at different angles. However, such arms composed of a series of multiple friction joints are not resilient. Since such arms appear to be specifically designed to remain in a particular configuration when pushed into that configuration by a human hand, they also remain in a particular configuration when deflected by collision with an external object. This is a problem for spanning a wide distance on either side of the bicycle. Such arms might work well for a short lateral distance, but not well for a longer lateral distance. How far outward can a laterally-extending member comprised of multiple friction joints extend from a bicycle before it starts to droop downwards as the bicycle travels bumpy surfaces? Since friction joints are non-resilient. With a relatively-long series of such joints extending outwards, each time the bicycle hits a bump the arm is knocked further downwards. Since these joints are non-resilient, downward drooping movement is cumulative. Also, with lights only mounted on the ends, there is limited ability to create the illusion of one or more laterally-moving points of light spanning a safety zone. The invention to be disclosed herein addresses these limitations.

SUMMARY OF THIS INVENTION

The invention disclosed herein includes a device and method for bicycle safety lighting that can help to prevent bicyclists from being hit by a vehicle from behind during the evening or at night, especially when the bicyclist is stopped at an intersection. This invention comprises: one or more flexibly-resilient light-supporting members that collectively span a bilateral safety zone around the bicycle that a vehicle should not enter; and a plurality of light sources on these flexibly-resilient light-supporting members that can be clearly seen by a driver approaching the bicycle from the rear. In an example, this plurality of light sources may flash in one or more sequences to create the illusion of one or more laterally-moving points of light. Laterally-moving lights can be particularly effective in attracting a driver's attention. This invention corrects many of the limitations of the prior art that have been identified in the previous section and can be a significant advance in bicycle safety.

INTRODUCTION TO THE FIGURES

These figures show examples of how this invention may be embodied, but they do not limit the full generalizability of the claims.

DETAILED DESCRIPTION OF THE FIGURES

FIGS. 1 through 5 show different examples of how this invention may be embodied. However, these examples do not limit the full generalizability of the claims.

Figure 1:
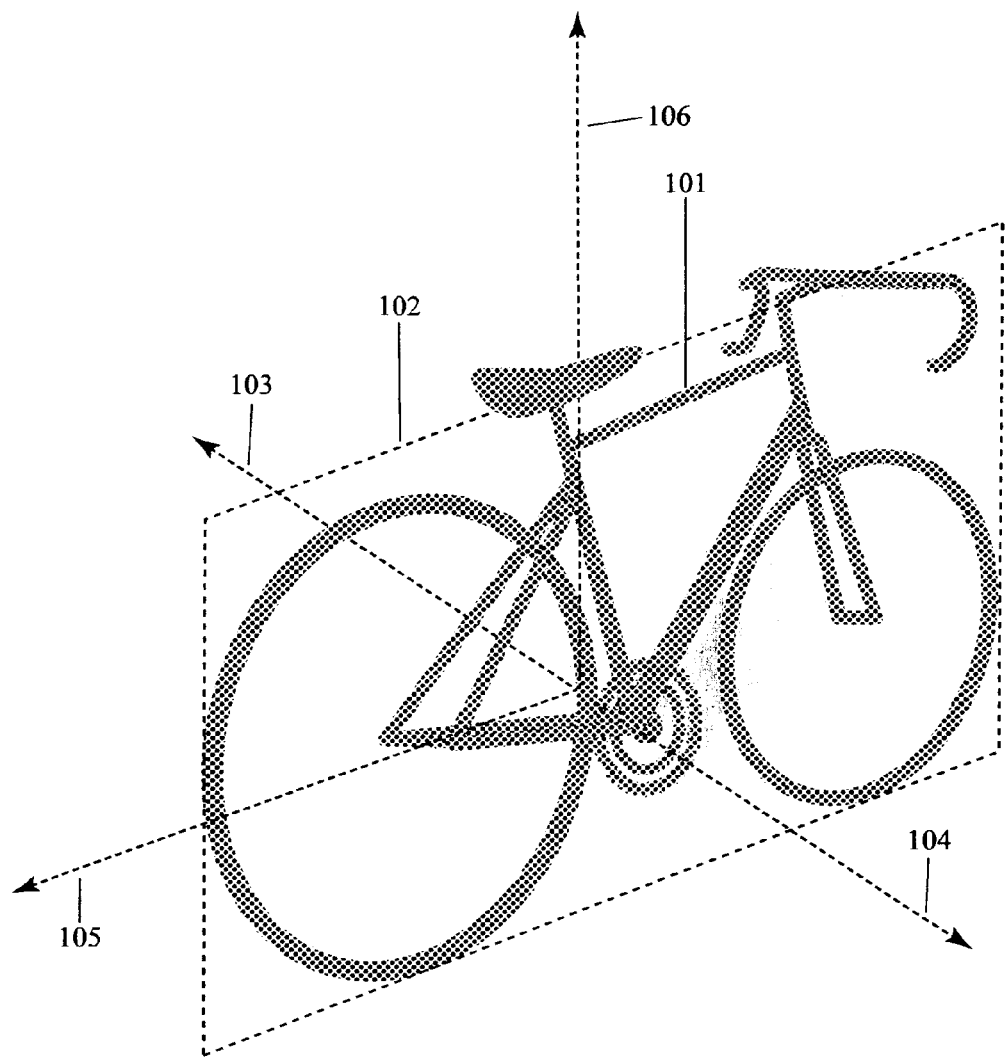
FIG. 1 shows a stylized bicycle in order to provide a spatial context for the embodiments of this invention that are disclosed in subsequent figures.

FIG. 1 shows an angled, rear-to-right side view of a stylized bicycle 101. FIG. 1 does not show the present invention yet, but rather provides a spatial framework and positional context for the examples of the invention that will be shown in subsequent figures. The invention to be disclosed in subsequent figures is partially specified in terms of its location in space relative to a bicycle. To aid in this specification, we now provide a framework for space around a bicycle.

The spatial framework for this invention begins with the dotted-line parallelogram 102 through the bicycle that is shown in FIG. 1. This parallelogram represents a (virtual) central longitudinal plane that roughly bisects the bicycle longitudinally. This central longitudinal plane is vertical, goes through the centers of the tubular components of the main frame of the bicycle (including the top tube, head tube, down tube, and seat tube), and divides space surrounding the bicycle into right and left sides.

In FIG. 1, space to the left of the central longitudinal plane is represented symbolically by dotted arrow 103. Dotted arrow 103 extends outward from the bicycle in a leftward mariner that is perpendicular to the central longitudinal plane. Space to the right of the central longitudinal plane is represented symbolically by dotted arrow 104. Dotted arrow 104 extends outward from the bicycle in a rightward manner that is perpendicular to the central longitudinal plane. Space to the rear of a roughly-central lateral plane (wherein this plane is vertical, goes though the seat post, and is perpendicular to the central longitudinal plane) is represented symbolically by dotted arrow 105. Dotted arrow 105 extends backward from roughly the center of the bicycle. Space above a horizontal plane that goes through the rear wheel axle is represented symbolically by dotted arrow 106. Dotted arrow 106 extends upward from roughly the center of the bicycle.

Figure 2:
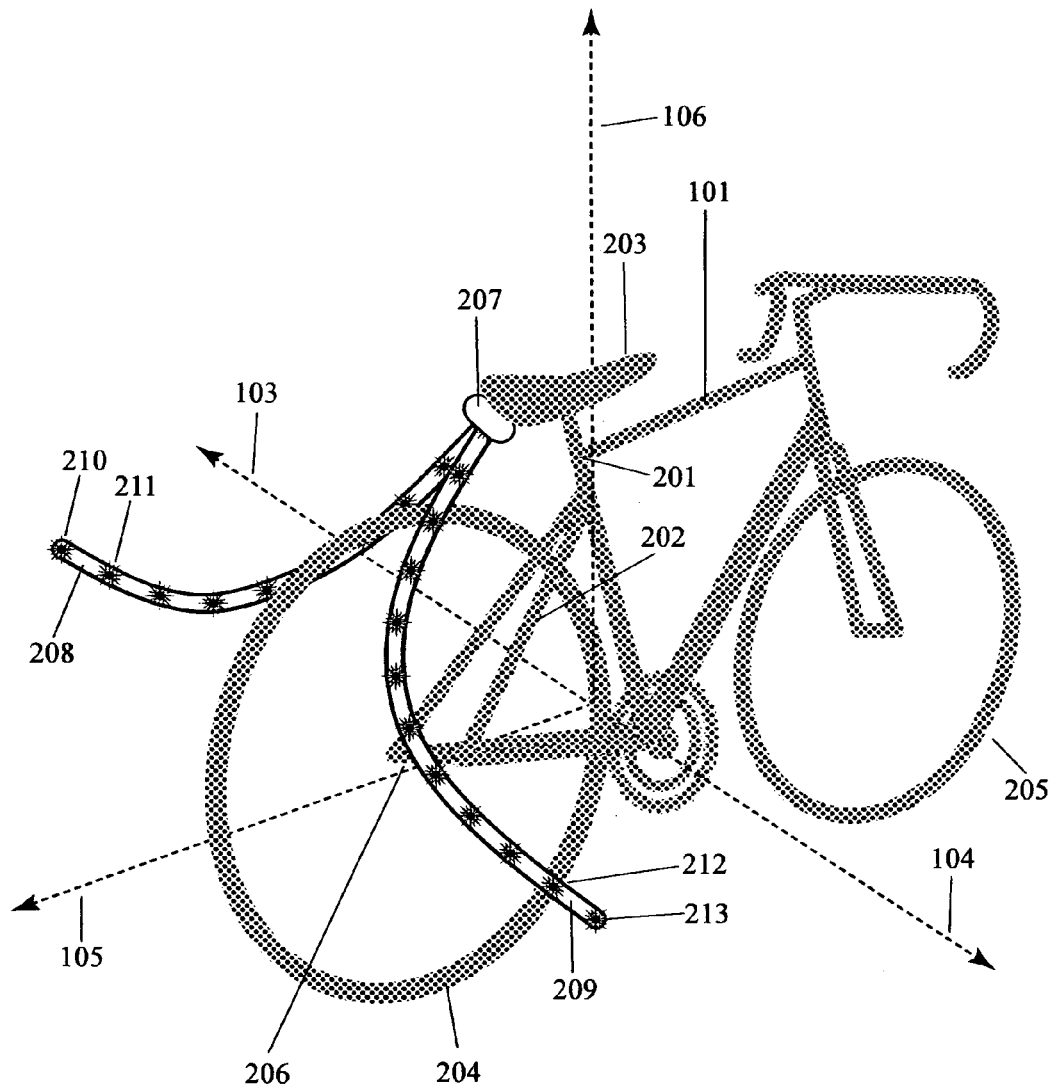
FIG. 2 shows an example of this invention embodied as longitudinal, transparent, tubular, and curved light-supporting members. These members look somewhat like insect feelers, facing rearwards and outwards with respect to the bicycle.

FIG. 2 shows a first example of this invention that is located within the context of the spatial framework that was introduced in FIG. 1. In FIG. 2, this invention is embodied as a pair of longitudinal, transparent, tubular, and curved light-supporting members, 208 and 209, each of which contains a series of twelve light sources. Light-supporting member 208 contains light sources including 210 and 211. Light-supporting member 209 contains light sources including 212 and 213. In this example, these light-supporting members look similar to a pair of insect feelers that extend backwards and outwards from bicycle seat 203. In FIG. 2, these two light-supporting members are attached to power source 207 which, in turn, is attached to the rear of bicycle seat 203.

FIG. 2 also identifies parts of the stylized bicycle in greater detail than in FIG. 1. In addition to the main frame 101 of the bicycle that was introduced in FIG. 1, FIG. 2 also identifies: bicycle seat post 201, bicycle seat stays 202, bicycle seat 203, bicycle rear wheel 204, bicycle front wheel 205, and bicycle rear wheel axle 206.

In the example shown in FIG. 2, this invention comprises: power supply 207 attached to the rear of bicycle seat 203, leftward-extending flexibly-resilient light-supporting member 208 attached to power supply 207, rightward-extending flexibly-resilient light-supporting member 209 attached to power supply 207, light sources 210 and 210 contained in flexibly-resilient light-supporting member 208, and light sources 212 and 213 contained in flexibly-resilient light-supporting member 209.

In an example, the light sources contained within, or otherwise supported by, the flexibly-resilient light-supporting members may receive electrical power through one or more wires incorporated into the flexibly-resilient light-supporting members. There are many examples of series of lights connected by wires in the prior art for other applications, such as Christmas tree lights, and the exact means of power transmission is not critical to this invention. Accordingly, the exact means of power transmission is not specified here. In another example, the lights sources may be openings or end-points of fiber optic cables. In an example, the light-supporting flexibly-resilient members may contain fiber optic cables or be comprised of a bundle of fiber optic cables of different lengths. There are many examples of fiber optic cables in the prior art.

In FIG. 2, flexibly-resilient light-supporting members 208 and 209 are shown in the configurations (which we call their "first configurations") which they assume absent any contact with an object external to the bicycle. A flexibly-resilient member is herein defined as a member that has a first configuration when it is not deflected by any contact with an external object, has a different configuration (may vary depending on the degree of deflection) when it is deflected by contact with an external object, and automatically returns to its first configuration after contact with the external object stops. It does not require any manual intervention by the rider to return to its first configuration after contact with the external object. In an example, if flexibly-resilient member 208 or 209 were to hit an external object (such as a post or a car) as the bicycle moves forward, then, as a flexibly-resilient member, it would easily deflect backwards. After contact with the external object is over, it would then automatically bounce or spring back to its original, non-deflected, first configuration.

In this example, each of the flexibly-resilient light-supporting members has a longitudinal axis. In this example, the length of this longitudinal axis may be virtually divided into four equal portions. In this example, this member is flexible with respect to deflection by an external object within two or more of these four equal portions, enabling it to bend at multiple places in response to contact with an external object. In this example, each of the flexibly-resilient light-supporting members is flexible throughout its entire longitudinal axis. In this example, each of the flexibly-resilient light-supporting members is also curved along its entire longitudinal axis.

The ability of a light-supporting member to flexibly deflect (upon contact with an external object) at multiple places along its longitudinal axis, combined with its curved shapes, enables smoother deflection and decreased probability of damage in the event of collision with an external object regardless of where the external object contacts the light-supporting member. This is a considerable improvement over lateral spacers, flags, poles, reflectors, and turn-signal bars in the prior art that are completely rigid and not flexible. This is also a substantive improvement over generally-rigid laterally-extending spacers, flags, poles, reflectors, and turn-signal bars in the prior art that are mainly rigid with only a single spring, hinge, or ball-and-socket joint near their base that offers only one place of deflection. This is also an improvement over non-resilient lateral spacers, flags, poles, reflectors, and turn-signal bars in the prior art that deflect upon contact with an external object, but do not automatically bounce or spring back to their original configuration without manual intervention by the bicyclist.

In the example of this invention shown in FIG. 2, the first configurations (undeflected by contact with an external object) of the longitudinal axes of the flexibly-resilient members extend outward from the bicycle in a combination of curved, lateral, downward, and backward trajectories. Since these members are flexibly-resilient, they can deflect inward and backward if hit by an external object as the bicycle moves forward. For example, if one of these members hits a tree, post, other bicycle, or car, then the member temporarily deflects inwards and backwards. These members are resilient enough that they do not deflect so much as to become entangled in the rear wheel spokes. However, they are also flexible enough that they do not break or snag when they hit a tree, post, other bicycle, or car. These members are also sufficiently resilient as to automatically return to their first configuration after contact with the external object stops, without the need for any manual intervention by the bicyclist. This is a great advantage over prior art that is not resilient in this manner.

The smooth tubular shape, round curved configuration, and flexible construction of light-supporting flexibly-resilient members 208 and 209 combine to make it very unlikely that these light-supporting members would snag on an external object. These characteristics also make it very unlikely that an external object would damage the light-supporting member, or vice versa, or that contact between the light-supporting member and an external object would cause an accident. These are significant advantages over relatively-rigid members in the prior art that stick out laterally and rigidly from a bicycle. Such relatively-rigid members (including rigid spacers, flags, reflectors, bumpers, and lights) can snag on external objects, be damaged by contact with external objects, damage those other objects, cause accidents, and injure pedestrians or other bicyclists. This invention disclosed herein greatly reduces these potential hazards.

In the example shown in FIG. 2, flexibly-resilient light-supporting members 208 and 209 are attached to the rear of bicycle seat 203 indirectly, via power supply, 207. In another example, flexibly-resilient members may have their own power sources and be directly attached to the bicycle. In this example, there are two flexibly-resilient light-supporting members. In other examples, there may be a single flexibly-resilient light-supporting member. In other examples, there may be more than two flexibly-resilient light-supporting members. In other examples, there may be multiple pairs of flexibly-resilient light-supporting members. In various examples, multiple flexibly-resilient light-supporting members may radially span a portion of the upper-rear quadrant of space around a bicycle in a manner somewhat like the tail feathers of a peacock or turkey. In an example, the inventor's visual imagery may be getting a bit much.

In this example, the light-supporting resiliently-flexible members are tubular and transparent. This enables them to support and protect lights within them, while having a smooth surface that is unlikely to snag on any external objects that they hit. In another example, the light-supporting members may be opaque cables to which a plurality of light sources are attached in a manner which is unlikely to snag on external objects. In another example, the light-supporting members may be bundles of fiber optic cables with different endpoints or other openings along their longitudinal axes.

In this example, the light sources in the light-supporting members are Light Emitting Diodes (LEDs). In other examples, these light sources may be incandescent light bulbs, florescent light bulbs, fiber optic cables, Electro Luminescent (EL) members, or other light sources. In various examples, light sources may be selected from the group consisting of: Light Emitting Diodes (LEDs); incandescent light bulbs; florescent light bulbs; fiber optic members; Electro Luminescent (EL) members; and coherent light sources. In this example, there are twelve light sources in each light-supporting member. In other examples, there may be a lesser number, or a greater number, of light sources in each light-supporting member. In this example, at least one of these members has a plurality of light sources on it, or within it, and these light sources can be seen by someone to the rear of the bicycle. In this example, at least one of these flexibly-resilient light-supporting members has multiple light sources located in different places along its length. In an example, there may be at least one light source in at least two of the four virtual portions dividing the longitudinal axes of the members into four equal lengths.

The light sources in the tubular and transparent light-supporting members in this example can be seen by someone behind the bicycle, including a vehicle driver approaching the bicycle from the rear in the evening or at night. In this example, someone can see the plurality of light sources in the flexibly-resilient light-supporting members from substantially any angle of approach to the rear of the bicycle. For example, a vehicle driver anywhere to the rear of the bicycle, within sufficient proximity, would be able to see the plurality of lights on the members illuminating a bilateral safety zone around the bicycle. This is in contrast to light sources mounted within the spokes of bicycle wheels which are not easily visible from a perspective directly behind the bicycle. This is also in contrast to light sources mounted on bicycle handlebars that are obscured by the bicyclist from the perspective of someone approaching the rear of the bicycle at certain angles. These are all reasons why it is important (in order to avoid rear-end collisions) to have light-supporting members be in the upper-rear quadrant of space around the bicycle, as shown in this example. These lights should be visible to the driver of a car approaching the bicycle from the rear at virtually any angle.

The relatively wide width (between 2-4 feet in this example) of the lateral space that is spanned by the plurality of light sources, combined with their observability from someone approaching the bicycle from the rear from any angle, enables these light sources to define a bilateral safety zone around the bicycle that can be seen clearly by someone behind the bicycle. This is a tremendous safety advantage compared to single-point bicycle lights in the prior art. This is also a safety advantage compared to limited-width (e.g. under 6 inches in width) small panel lights or bar lights in the prior art. The novel use of flexibly-resilient members spanning a portion of the upper-rear quadrant of space relative to the bicycle, as disclosed in this invention, creates a lighted safety zone around the bicycle that is particularly visible by someone approach the rear of the bicycle. In an example, this lighted bilateral safety zone may be at least three feet in lateral width and at least two feet above the horizontal plane intersecting the rear axle of the bicycle. In an example, this lighted bilateral safety zone may be at least three feet in lateral width and at least one foot above the horizontal plane intersecting the top of the bicycle seat.

In the prior art, there was a conflict between having bicycle lights that span a wide bilateral distance vs. safety. Without the technology disclosed in this invention, wide rigid structures that would have been required to support lights spanning such a wide distance would be unsafe when they collide with external objects. In theory, one could have attached a three-foot wide theater-marquee-style panel of LEDs to the back of a bicycle seat, but this would cause havoc as the bicyclist passes tree branches or goes through tight traffic. This present invention solves this problem. This present invention provides bicycle lights that span a wide bilateral space, without compromising rider safety. This present invention discloses innovative flexibly-resilient light-supporting members that are flexible and deflectable at multiple locations along their longitudinal axes, while defining a lighted bilateral safety zone around the bicycle that can be clearly seen at some distance by a driver approaching the bicycle from the rear.

In the example shown in FIG. 2, the flexibly-resilient members collectively span a bilateral safety zone at a single point in time. This distinguishes this invention from prior art (such as vertical light poles or vertical flag poles mounted on the back of a bicycle) which rely on the swaying motion of a moving bicycle to span a lateral zone over time. Such prior art does not span a substantive bilateral safety zone when the bicycle is stopped. Unfortunately, bicyclists can be particularly vulnerable to being hit from the rear or from the side when they are stopped an intersection, especially in dim light. In contrast, this present invention spans a substantive bilateral safety zone even when the bicycle is stopped. This is a significant improvement in bicycle safety over the prior art.

In addition to helping to prevent a bicyclist from being hit from behind, this invention can also help to prevent a bicyclist being hit from the left. For example, it can help to avoid having a right-turning car intrude into the left-side safety zone of a bicycle and run over the bicyclist. Such accidents are an all-too-frequent cause of bicycle fatalities. Unfortunately, car drivers are sometimes oblivious to a bicyclist to the right of their vehicle, even if the bicycle has safety lighting. This is especially a problem with non-car vehicles, such as vans or trucks, which do not have windows along much of their right side. Although the primary focus of this invention is on creating a bilateral safety zone of light around the bicycle, the extension of flexibly-resilient members outwards from the sides of the bicycle can also create a sound component to this bilateral safety zone. For example, a car that enters the bilateral safety zone will come into contact with an extended flexibly-resilient member shortly before the car potentially collides with the body of the bicyclist. Depending on the resiliency of, and the materials used in, the flexibly-resilient members, this first contact can result in a tapping sound on the exterior of the car. Even a driver who cannot see the bicycle or bicycle lights may hear the tapping sound on the exterior of the vehicle.

In an example, the passive tapping sound of the car encountering the tip of the left light-supporting member may be augmented by an active deflection alarm or vibrating mechanism. In an example, the light-supporting member may have a deflection-detecting system that sounds an alarm that the vehicle driver can hear if the member is deflected by contact with a vehicle. Although this first contact may only be seconds before potential collision between the vehicle and the bicyclist's body, this may be enough time to alert the vehicle driver to react and avoid injuring the bicyclist. In another example, the tip of the flexibly-resilient members may have a vibrating mechanism that vibrates upon deflection. This vibrating mechanism may interact with the exterior of the vehicle so as to turn the exterior of the vehicle into a virtual speaker cone. The vibration causes the exterior to resonate, creating a loud sound within the vehicle that can be heard over the noise of the engine, alerting the driver to the presence of the bicyclist to their right. A variation of this invention that incorporates such an alarm or vibrating mechanism, activated when a car comes within 2-3 feet of a bicycle could reduce bicyclist fatalities from right-turning vehicles. In a variation on this example, supplemented by a simple accelerometer, the alarm could be set to only go off if an object intrudes within the bilateral safety zone when the bicycle is stopped.

In the example of this invention that is shown in FIG. 2, the bilateral safety zone that is spanned by lights includes: at least some space to the right of the central longitudinal plane; at least some space to the left of the central longitudinal plane; at least some space to the rear of a lateral plane that is vertical and goes though the seat post and is perpendicular to the central longitudinal plane; and at least some space above a horizontal plane that goes through the rear wheel axle. In various examples, this zone should be at least six inches in width, wherein width is measured in a plane perpendicular to the central longitudinal plane. In this example the bilateral safety zone spanned by the light-supporting members is 2-4 feet in width.

In the example in FIG. 2, the flexibly-resilient light-supporting members are longitudinal, tubular, and curved. In this example, one member extends outwards from the bicycle in a path through space that includes both rightward direction and backward direction. A second member extends outwards from the bicycle in a path through space that includes both leftward direction and backward direction. In another example, these two members could be combined into a single member with ends extending outwards to the right and to the left of the central longitudinal plane of the bicycle. In the latter case, this longitudinal member may have a first part that extends outwards from the bicycle in a path through space that includes both rightward direction and backward direction and a second part that extends outwards from the bicycle in a path through space that includes both leftward direction and backward direction.

In this example, the two light-supporting members collectively form a shape that is similar to the shape of a capital letter "V," albeit with curved rather than straight sides, wherein the top (open) portion of the letter shape faces backwards from the bicycle seat. In various examples, a light-supporting member or combination of light-supporting members may form a shape of some other capital letter, such as "U", "Y", "T", or "O," wherein the top of the letter shape also faces backwards.

In various examples, flexibly-resilient light-supporting members may be combined to form organic shapes. In the example in FIG. 2, the shape formed by the two light-supporting members is similar to the outer lines of a whale or fish tail. This is not a coincidence. Shapes that are useful in nature for smooth travel through water or air can be useful for designing light-supporting members that are unlikely to snag on external objects. In various examples, flexibly-resilient light-supporting members may form a shape selected from one of the following group of shapes: a pair of insect antennae or feelers, wherein the ends of the antennae or feelers extend outward in at least partially a backwards direction; a pair of curved members that comprise the outer lines of a whale tail shape; and a pair of curved members that comprise a the outer lines of bird wings.

In FIG. 2, flexibly-resilient light-supporting members 208 and 209 are attached, indirectly through power supply member 207, to the rear of the bicycle seat 203. In various examples, light-supporting members may be attached, either directly or via a power supply member, to other parts of the bicycle that allow them to form a bilateral safety zone around the sides and to the rear of the bicycle. In various examples, the members, either directly or indirectly, may be attached to the bicycle at a location selected from the following group of locations: the main bicycle frame 101, the post supporting the bicycle seat 201, the bicycle seat 203, the rear wheel axle 206, and the rear fender.

In this example, the flexibly-resilient light-supporting members are hollow transparent polymer tubes. In this example, these tubes have approximately half-inch exterior diameters. In various examples, these tubes may have exterior diameters ranging from ⅛" to 2". These tubes have sufficient wall thickness and rigidity to extend outwards from the bicycle, but also have sufficient flexibility to deflect backward if hit by an object as the bicycle moves forward and then return to their original non-deflected shape after contact with the object is over. In this example, these light-supporting members are not so rigid that they retain a deflected configuration imparted to them from contact with an external object. Rather, if deflected into an alternative configuration imparted to them by contact with an external object, they will "spring back" to their original non-deflected first configuration when this contact stops.

In this example, these tubes only contain strings of LED lights. In other examples, these tubes may also contain longitudinal spring or cable members, in addition to strings of lights, in order to provide greater resiliency or rigidity. In an example, these lights may be connected in parallel. In another example, these lights may be connected in series. In an example these light sources may be openings in fiber optic cables that are part of the flexibly-resilient light-supporting members.

In the example of this invention that is shown in FIG. 2, the light-supporting members have uniform flexibility along their curved, longitudinal axes. In other examples, the light-supporting members may be constructed with less flexibility closer to the bicycle (so that they stick out farther) and more flexibility farther away from the bicycle (so that they deflect more easily if they hit an external object).

In this example, the flexibly-resilient light-supporting members 208 and 209 can be detached from power source 207 when the bicycle is parked, so that they are not stolen. Also, in this example, these light-supporting members can be carried by the bicyclist in a bag, backpack, purse, or briefcase in a coiled configuration that is more compact than the extended first configuration when attached to the bicycle. In another example, power source 207 can also be detached from the rear of bicycle seat 203 when the bicycle is parked. In an example, power source 207 contains a battery. In an example, power source 207 obtains power from rotation of the bicycle wheels.

In the example of this invention that is shown in FIG. 2, there are a plurality of lights (including 210, 211, 212, and 213) that are contained in light-supporting members 208 and 209. In this example, these lights flash in a lateral sequence. In this example, this flashing sequence is an overall right-to-left sequence, moving from right-most light 213 to left-most light 210.

In other examples, the plurality of light sources can flash in a left-to-right sequence, from the left-most light 210 to the right-most light 213. In another example, these lights can flash in a center-to-exterior sequence, from the lights closest to the power supply 207 to the lights at the ends of the light-supported members, 210 and 213. In another example, these lights can flash in an exterior-to-center sequence, from the lights at the ends of the light-supported members, 210 and 213, to the lights closest to the power supply 207. In another examples, the plurality of lights can flash in a multiple moving-light sequences, like a theater marquee. In this latter example, these multiple moving-light sequences can each involve three adjacent lights that flash in a sequential manner.

In all of these examples, the sequence or sequences of flashing light create the appearance of one or more laterally-moving points of light from the perspective of a person (such as the driver of a vehicle) who is approaching the rear of the bicycle.

In various examples, the plurality of light sources can flash in one or more sequences that create the appearance of one or more points of laterally-moving light as viewed by someone behind the bicycle. In various examples, the plurality of light sources may flash in one or more sequences that create the appearance of one or more points of laterally-moving light spanning at least six inches in width, as viewed by someone behind the bicycle.

There are a number of reasons why wide-scale rear-facing lateral light motion is an advantage over prior art with single-point or limited-width bicycle lights, even when those single-point or limited-width lights are bright or flashing. Lateral sequences of flashing lights create the illusion of one or more points of light (or lighted objects) that are moving in a direction that is perpendicular to the direction of motion of a driver approaching the bicycle from the rear. This can trigger a collision avoidance reaction in the driver's brain more so than either stationary lights along the roadside or fixed-position lights on a bicycle moving in the same direction as the car.

Lights moving in a lateral manner can attract the attention of a vehicle driver approaching the rear of the bicycle more so than lights in a stationery position on the bicycle (or bicyclist) or lights moving in a longitudinal manner (such as around the wheels of the bicycle). Laterally-moving lights stand out from stationary lights along the roadway and lights moving in the front-to-back vector of the roadway. Laterally-moving lights are often interpreted by a driver's brain as more likely to indicate a moving object with which the driver's vehicle could potentially collide. This is the rationale behind traditional "railroad crossing" lights that flash in a lateral manner, warning an approaching driver to slow down to avoid collision with a train. Similar lateral light movement is used by road crews working on highways at night to divert people away from closed lanes.

Resiliently-flexible, relatively-wide-scale lateral light motion that can be seen by someone approaching the rear of the bicycle is a significant safety improvement over bicycle lighting options in the prior art. From the perspective of a driver approaching an object, an object moving in a direction that is perpendicular to the forward motion of a driver's vehicle can enter the driver's field of vision more quickly, and allow less time for collision avoidance, than objects moving along the same axis as the vehicle. This is one reason why peripheral vision is so critical in driving.

If an object comes at a driver in a frontal manner, then the driver can usually see it coming from far away and have plenty of time to respond. However, if an object comes at a driver from the side, then there can be only a short time from when the object first enters the driver's field of vision to when it intersects and collides. For example, drivers are more likely to be blind-sided by, and collide with, a deer that leaps out from the roadside than to collide with a deer that is running in parallel with the road. This is one reason why lateral light motion can trigger alarm and collision avoidance behavior in a driver approaching a bicycle from the rear in the dark. Laterally-moving light is an improvement over a fixed-location light on the back of the bicycle seat, on the bicycle fender, or on the bicyclist's helmet or on top of a vertical pole.

A fixed-location light can also backfire by causing the driver to focus on the light in the darkness. People can unconsciously aim towards the point on the horizon where they are focusing. It can be counter-intuitive for someone to focus on one point on the horizon but steer toward a different point.

Someone navigating a boat generally focuses on where they want to go. By way of analogy, there is a famous Far-Side™ cartoon in which one deer has a target-like mark on his chest. The cartoon shows a second deer saying to deer with the target mark—"Bummer of a birthmark, Hal." A bicycle with a single rear-facing light can be like that deer. The last thing that a bicyclist wants to do is to make themself a target for an approaching car. This is especially true with a narrow-width fixed-location light because distance to such a light can be difficult to determine in dim light or complete darkness. A relatively-near dim light may be interpreted by an approaching driver as a relatively-far-away bright light. A narrow light provides few size-related proximity cues. In contrast, a relatively-wide laterally-spanning light provides good visual cues concerning proximity for an approaching driver. The approaching driver can see it increase in apparent width as the driver approaches it. When lights move in a lateral sequence, spanning a relatively wide bilateral safety zone, then they comprise an even more effective means of communicating proximity to an approaching driver.

Further, objects that are moving in a lateral manner that is perpendicular to the forward motion of a driver's vehicle stand out in contrast to the apparent movement of stationary objects along the roadside. From a driver's perspective, as a vehicle moves forward, stationary objects along the roadside appear to approach the vehicle along its forward axis of movement. Stationary objects do not appear to move laterally. A light in a fixed position on a bicycle can blend in with the apparent movement of stationary objects along the roadside. However, a bicycle light that moves laterally stands out in contrast to stationary objects. For all these reasons, lateral motion triggers greater attention and collision-avoiding behavior in a driver's brain and reduces the chances of a bicyclist being rear-ended by an approaching car in the evening or at night.

The potential advantage of being illuminated with laterally-moving lights has not escaped the attention of bicyclists. Their comments in forums confirm the value of laterally-moving lights. However, until this present invention, there has not been technology that offers flexibly-resilient moving lights with lateral motion that span a relatively wide bilateral safety zone around the rear of the bicycle. Bicyclists have noted that motorized vehicle drivers pay particular attention to laterally-moving lights. Relevant quotes from bicycle discussion forums include the following—"I give the bike a little left-right-left wobble; hopefully the wagging light will draw attention where just a straight headlight might not"-and- "the wobble . . . might be more of a visible sign than a solid light coming down the street"-and- "it is useful to play the light back and forth while waiting at a busy intersection." These quotes may be found at (www.beginnerbikers.org/forum/archive/index.php/t-330.html and http://www.easystreetrecumbents.com/stuff/safety.html)

It is important to note that the bicyclists quoted above have had to manually wag their tail light "back and forth" while they are vulnerably "waiting at a busy intersection" because the prior art does offer them technology that will do this automatically (without rigid members that stick out and can cause an accident). This present invention fills this unmet need. This present invention can protect a bicyclist from being hit by an approaching car, especially a bicyclist who is vulnerable while stopped at an intersection in the evening or at night.

In the example shown in FIG. 2, all of the light sources in the light-supporting members are the same color (white) and brightness. In various examples, the brightness, color, and/or flashing sequence of these light sources can change with changes in the speed or direction of the bicycle. In other examples, this device can serve as an environmental sensor. The brightness, color, and/or flashing sequence of these light sources can change based on the proximity, speed, or direction of external objects such as cars.

Figure 3:
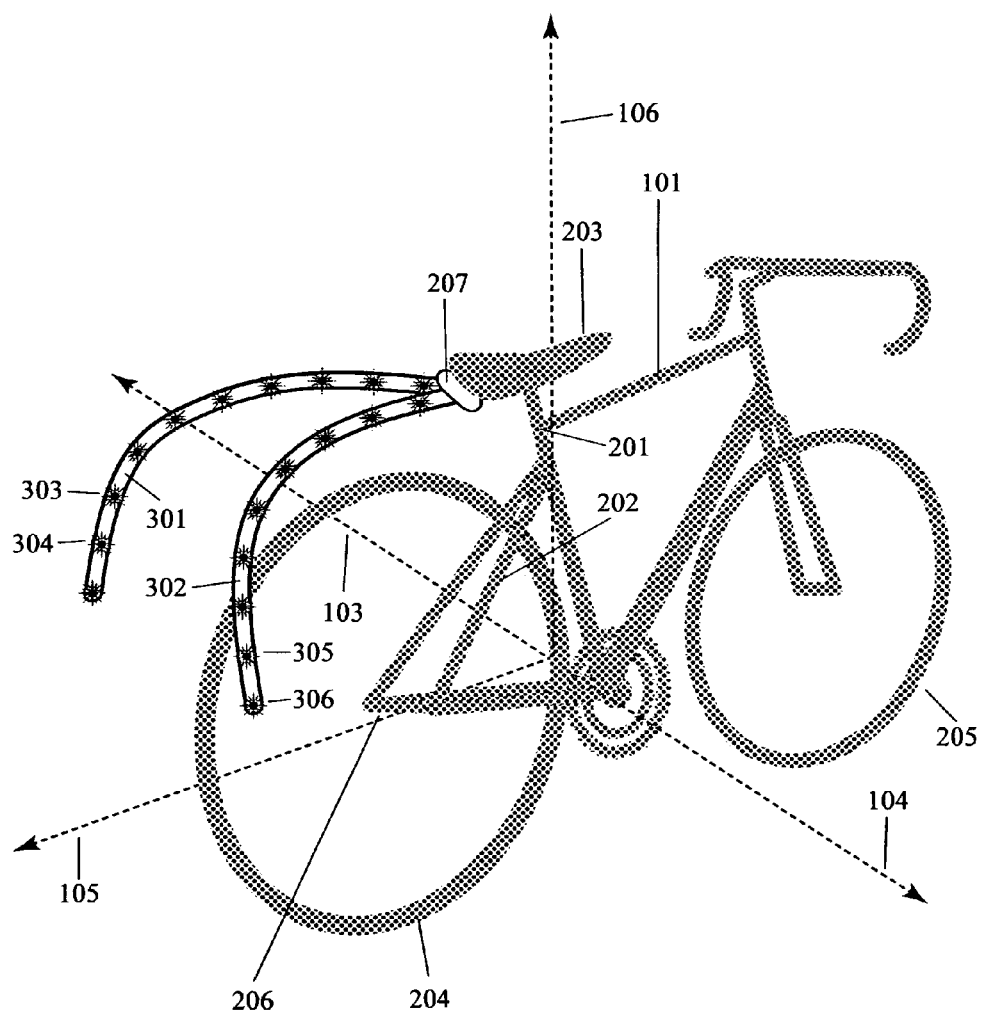
FIG. 3 shows an example of this invention embodied as longitudinal, transparent, tubular, and curved light-supporting members. These members look somewhat like insect antennae, facing upwards and rearwards with respect to the bicycle.

FIG. 3 shows another example of this invention. This example includes a pair of longitudinal, transparent, tubular, and curved light-supporting members, 301 and 302, that are similar to those shown in FIG. 2. These members contain light sources 303, 304, 305, and 306. However, the flexibly-resilient light-supporting members in FIG. 3 first turn upward and outward before turning downward, as opposed to the light-supporting members in FIG. 2 that first turn downward before turning outward. The light-supporting members in FIG. 3 look somewhat like a pair of insect antennae wherein the ends of the antennae extend outward in at least partially a backwards direction.

In an example, this invention includes at least one flexibly-resilient member wherein these members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction. In an example, this invention includes at least one flexibly-resilient member wherein the first configuration of a member, or members collectively, forms a shape selected from one of the following group of shapes: a pair of insect antennae or feelers wherein the ends of the antennae or feelers extend outward in at least partially a rearwards direction; a pair of curved members that comprise the outer lines of a whale tail shape or fish tail shape; and a pair of curved members that comprise the outer lines of bird wings.

Figure 4:
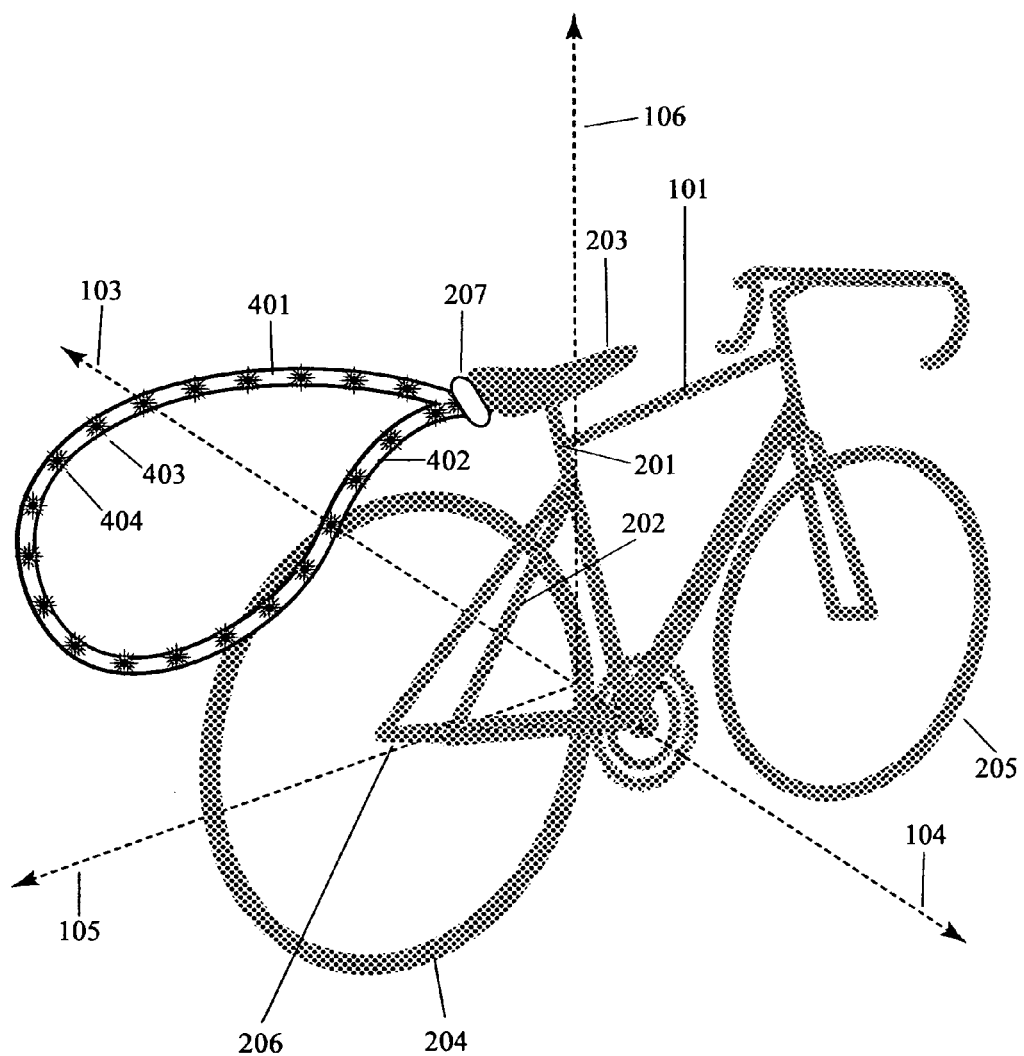
FIG. 4 shows an example of this invention embodied as a lighted tubular loop that faces upwards and rearwards with respect to the bicycle.

FIG. 4 shows another example of this invention. In this example, there is a single light-supporting member that is in the form of a loop, with loop ends 401 and 402. This loop contains light sources 403 and 404. In this example, the light-supporting loop is continuous between loop ends 401 and 402. In another example, there may be a detachment mechanism between loop ends 401 and 402 wherein the two loop ends automatically detach from each other if a certain amount pressure is exerted on the loop. In an example, this detachment mechanism may be comprised of two magnets, one on each end of the loop. This detachment mechanism can be a safety mechanism in case an external object is caught in the loop. Expressed in more generic words, FIG. 4 shows an example of this invention wherein at least one member forms a loop that includes: a first part of the loop whose first configuration extends outwards from the bicycle in a path through space that includes both rightward direction and backward direction; and a second part of the loop whose first configuration extends outwards from the bicycle in a path through space that includes both leftward direction and backward direction.

In an example, this invention includes at least one flexibly-resilient member wherein at least one longitudinal member includes: a first part whose first configuration extends outwards from the bicycle in a path through space that includes both rightward direction and rearward direction; and a second part whose first configuration extends outwards from the bicycle in a path through space that includes both leftward direction and rearward direction. In an example, this invention includes at least one flexibly-resilient member wherein at least one member forms a loop that includes: a first part of the loop whose first configuration extends outwards from the bicycle in a path through space that includes both rightward direction and rearward direction; and a second part of the loop whose first configuration extends outwards from the bicycle in a path through space that includes both leftward direction and rearward direction.

In an example, this invention is a bicycle safety lighting device comprising: at least one flexibly-resilient light-supporting member attached to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; and (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle; and a plurality of light sources on, or within, the at least one flexibly-resilient light-supporting member, wherein these light sources can be seen by someone to the rear of the bicycle.

In an example, this invention includes at least one flexibly-resilient member wherein at least one member has a longitudinal axis and the first configuration of this longitudinal axis is curved. In an example, this invention includes at least one flexibly-resilient member wherein the first configuration of a member, or members collectively, forms a shape selected from one of the shapes of following group of capital letters—V, U, Y, T, and O—and wherein the top of the letter shape faces rearwards. In an example, this invention includes a bilateral safety zone wherein this zone is at least one foot in width.

In an example, this invention includes at least one flexibly-resilient member wherein at least one member has sufficient rigidity to extend outwards from the bicycle; but also has sufficient flexibility to deflect rearward if hit by an object as the bicycle moves forward and then return to its original non-deflected shape after contact with the object is over. In an example, this invention includes at least one flexibly-resilient member wherein at least one member can be removed from the bicycle and transported in a second configuration that is more compact than the first configuration. In an example, this invention includes at least one flexibly-resilient member wherein at least one member attaches, either directly or via a power supply member, to the bicycle at a location selected from the following group of locations: the main bicycle frame, the post supporting the bicycle seat, the bicycle seat, the rear fender, and the rear wheel axle.

In an example, this invention includes a plurality of light sources wherein these lights flash in one or more sequences that create the appearance of one or more points of moving light, as seen by someone to the rear of the bicycle. In an example, this invention includes a plurality of light sources wherein these lights flash in one or more sequences that create the appearance of one or more points of light moving in a lateral manner, spanning at least six inches in width, as seen by someone to the rear of the bicycle.

In an example, this invention is a bicycle safety lighting device comprising: at least one flexibly-resilient light-supporting member attached to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle; and (c) wherein at least one member has a longitudinal axis, the length of this longitudinal axis may be virtually divided into four equal portions, and this member is flexible with respect to deflection by an external object within two or more of these four equal portions; and (d) wherein these members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction; and a plurality of light sources on, or within, the at least one flexibly-resilient light-supporting member, wherein these light sources can be seen by someone to the rear of the bicycle.

In an example, this invention is a method of bicycle safety lighting comprising: attaching at least one flexibly-resilient light-supporting member to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle; (c) wherein at least one member has a longitudinal axis, the length of this longitudinal axis may be virtually divided into four equal portions, and this member is flexible with respect to deflection by an external object within two or more of these four equal portions; and (d) wherein these members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction; and illuminating a plurality of light sources on, or within, the at least one flexibly-resilient light-supporting member, wherein these light sources can be seen by someone to the rear of the bicycle.

Figure 5:
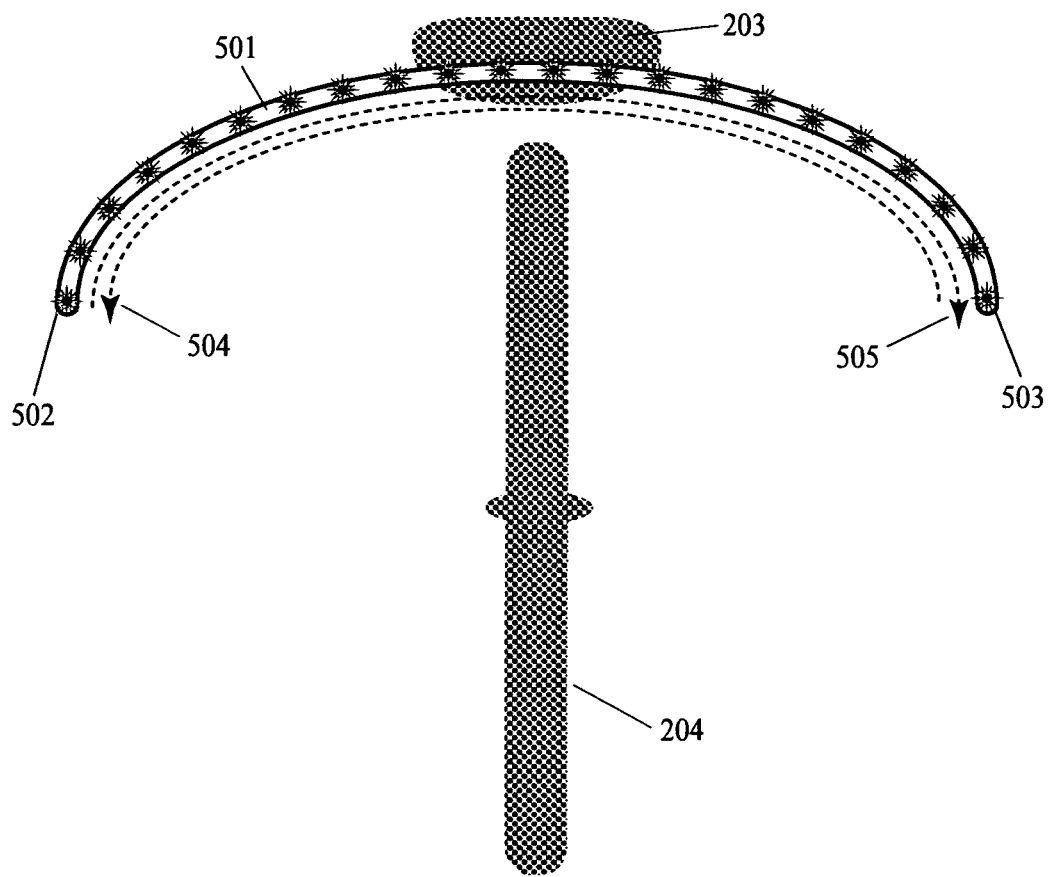
FIG. 5 shows a perspective of one embodiment of this invention that highlights apparent lateral light motion from a flashing sequence, as seen by someone approaching the bicycle from the rear.

FIG. 5 shows an example of this invention, highlighting apparent lateral light motion from a flashing sequence, as viewed from a perspective directly to the rear of the bicycle. FIG. 5 shows a rear-view of a longitudinal, transparent, tubular, and curved light-supporting member, 501, that contains a series of lights including 502 to the left and 503 to the right. In this example, light-supporting member 501 is attached to bicycle seat 203. The rear wheel, 204, of this stylized bicycle is also shown in FIG. 5. In this example, at least one flexibly-resilient light-supporting member has multiple light sources, located in different places along its length.

Dotted curved arrows 504 and 505 in FIG. 5 show the directions of apparent lateral light motion as the lights in light-supporting member 501 flash in two examples of a lateral flashing sequence. Dotted curved arrow 504 shows the direction of apparent lateral light motion from right to left, from the perspective of someone directly to the rear of the bicycle, as the lights flash in a sequence from light 503, through intermediate lights, to light 502. Dotted curved arrow 505 shows the direction of apparent lateral light motion from left to right, from the perspective of someone directly to the rear of the bicycle, as the lights flash in a sequence from light 502, through intermediate lights, to light 503.

In another example based on the embodiment in FIG. 5, apparent lateral light motion from the perspective of someone directly to the rear the bicycle may comprise a flashing sequence starting in the middle of light-supporting member 501 and moving outward in two moving points of light to end lights 502 and 503. In another example, there may be the appearance of multiple moving points of light, as in a theater marquee, from the laterally-sequential flashing of contiguous light triplets or light quadruplets.

In an example, this invention includes at least one flexibly-resilient member wherein at least one member has a longitudinal axis, the length of this longitudinal axis may be virtually divided into four equal portions, and this member is flexible with respect to deflection by an external object within two or more of these four equal portions. In an example, this invention includes at least one flexibly-resilient member wherein at least one member includes a fiber optic cable. In an example, this invention includes at least one flexibly-resilient member wherein at least one member has less flexibility nearer to the bicycle and more flexibility farther from the bicycle. In an example, this invention includes a plurality of light sources wherein the brightness, color, and/or flashing sequence of these light sources changes with: changes in the speed or direction of the bicycle; changes in the proximity, speed, or direction of external objects; or both. In an example, this invention includes at least one flexibly-resilient member wherein deflection of this member by an object external to the bicycle, such as a car, sounds an alarm or vibrates to alert people to the proximity of the bicycle and external object.

I claim:

1. A bicycle safety lighting device comprising:
   at least one flexibly-resilient light-supporting member attached to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; and (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle;
   and a plurality of light sources on, or within, the at least one flexibly-resilient light-supporting member, wherein these light sources can be seen by someone to the rear of the bicycle unobscured by the bicycle rider; wherein this plurality of light sources collectively span from a left location which is at least one foot to the left of the central longitudinal plane to a right location which is at least one foot to the right of the central longitudinal plane; wherein there are at least three light sources in this plurality of light sources; and wherein the maximum horizontal gap between adjacent light sources as seen by someone to the rear of the bicycle is no greater than one foot.

2. The at least one flexibly-resilient light-supporting member in claim 1 wherein at least one member has a longitudinal axis, the length of this longitudinal axis may be virtually divided into four equal portions, and this member is flexible with respect to deflection by an external object within two or more of these four equal portions.

3. The at least one flexibly-resilient light-supporting member in claim 1 wherein these members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction.

4. The at least one flexibly-resilient light-supporting member in claim 1 wherein at least one member has a longitudinal axis and the first configuration of this longitudinal axis is curved.

5. The at least one flexibly-resilient light-supporting member in claim 1 wherein at least one longitudinal member includes: a first part whose first configuration extends outwards from the bicycle in a path through space that includes both rightward direction and rearward direction; and a second part whose first configuration extends outwards from the bicycle in a path through space that includes both leftward direction and rearward direction.

6. The at least one flexibly-resilient light-supporting member in claim 1 wherein at least one member forms a loop that includes: a first part of the loop whose first configuration extends outwards from the bicycle in a path through space that includes both rightward direction and rearward direction; and a second part of the loop whose first configuration extends outwards from the bicycle in a path through space that includes both leftward direction and rearward direction.

7. The at least one flexibly-resilient light-supporting member in claim 1 wherein the first configuration of a member, or members collectively, forms a shape selected from one of the shapes of following group of capital letters —V,U,Y,T, and O —and wherein the top of the letter shape faces rearwards.

8. The at least one flexibly-resilient light-supporting member in claim 1 wherein the first configuration of a member, or members collectively, forms a shape selected from one of the following group of shapes: a pair of insect antennae or feelers, wherein the ends of the antennae or feelers extend outward in at least partially a rearwards direction; a pair of curved members that comprise the outer lines of a whale tail shape or fish tail shape; and a pair of curved members that comprise the outer lines of bird wings.

9. The at least one flexibly-resilient light-supporting member in claim 1 wherein at least one member has sufficient rigidity to extend outwards from the bicycle; but also has sufficient flexibility to deflect rearward if hit by an object as the bicycle moves forward and then return to its original non-deflected shape after contact with the object is over.

10. The at least one flexibly-resilient light-supporting member in claim 1 wherein at least one member has less flexibility nearer to the bicycle and more flexibility farther from the bicycle.

11. The at least one flexibly-resilient light-supporting member in claim 1 wherein at least one member can be removed from the bicycle and transported in a second configuration that is more compact than the first configuration.

12. The at least one flexibly-resilient light-supporting member in claim 1 wherein at least one of these flexibly-resilient light-supporting members has multiple light sources, located in different places along its length.

13. The at least one flexibly-resilient light-supporting member in claim 1 wherein at least one flexibly-resilient light-supporting member is, or contains, one or more fiber optic cables.

14. The light sources in claim 1 wherein these light sources are selected from the group consisting of: Light Emitting Diodes (LEDs); incandescent light bulbs; florescent light bulbs; fiber optic members; Electro Luminescent (EL) members; and coherent light sources.

15. The plurality of light sources in claim 1 wherein these lights flash in one or more sequences that create the appearance of one or more points of light moving in a lateral manner as seen by someone to the rear of the bicycle.

16. The plurality of light sources in claim 1 wherein the brightness, color, and/or flashing sequence of these light sources changes with: changes in the speed or direction of the bicycle; changes in the proximity, speed, or direction of external objects; or both.

17. The at least one flexibly-resilient light-supporting member in claim 1 wherein deflection of this member by an object external to the bicycle, such as a car, sounds an alarm or vibrates to alert people to the proximity of the bicycle and external object.

18. A bicycle safety lighting device comprising:
at least one flexibly-resilient light-supporting member attached to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle; (c) wherein at least one flexibly-resilient member has a longitudinal axis, the length of this longitudinal axis may be virtually divided into four equal portions, and this member is flexible with respect to deflection by an external object within two or more of these four equal portions; and (d) wherein these flexibly-resilient members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction;
and a plurality of light sources on, or within, the at least one flexibly-resilient light-supporting member, wherein these light sources can be seen by someone to the rear of the bicycle unobscured by the bicycle rider; wherein this plurality of light sources collectively span from a left location which is at least one foot to the left of the central longitudinal plane to a right location which is at least one foot to the right of the central longitudinal plane; wherein there are at least three light sources in this plurality of light sources; and wherein the maximum horizontal gap between adjacent light sources as seen by someone to the rear of the bicycle is no greater than one foot.

19. A method of bicycle safety lighting comprising:
attaching at least one flexibly-resilient light-supporting member to a bicycle: (a) wherein a flexibly-resilient member is a member that has a first configuration when not deflected by contact with an object external to the bicycle, has a different configuration if deflected by contact with an object external to the bicycle, and automatically returns to the first configuration after contact with the object external to the bicycle stops; (b) wherein one or more of these flexibly-resilient members collectively span a bilateral safety zone at a single point in time, wherein this zone includes: a portion of the space to the right of the central longitudinal (front-to-back) plane that is vertical and goes through the main frame of the bicycle, a portion of the space to the left of this central longitudinal plane, a portion of the space to the rear of a lateral (side-to-side) plane that is vertical and goes though the seat post and is perpendicular to the central longitudinal plane, and a portion of the space above a horizontal plane that goes through the rear wheel axle; and (c) wherein at least one flexibly-resilient member has a longitudinal axis, the length of this longitudinal axis may be virtually divided into four equal portions, and this member is flexible with respect to deflection by an external object within two or more of these four equal portions; and (d) wherein these flexibly-resilient members include: a first member or part of a member whose first configuration extends outwards from the bicycle in a path through space that includes both rightward direction and rearward direction; and a second member or part of a member whose first configuration extends outwards from the bicycle in a path through space that includes both leftward direction and rearward direction;
and illuminating a plurality of light sources on, or within, the at least one flexibly-resilient light-supporting member, wherein these light sources can be seen by someone to the rear of the bicycle unobscured by the bicycle rider; wherein this plurality of light sources collectively span from a left location which is at least one foot to the left of the central longitudinal plane to a right location which is at least one foot to the right of the central longitudinal plane; wherein there are at least three light sources in this plurality of light sources; and wherein the maximum horizontal gap between adjacent light sources as seen by someone to the rear of the bicycle is no greater than one foot.

* * * * *